United States Patent
Dabak et al.

(10) Patent No.: US 9,344,314 B2
(45) Date of Patent: May 17, 2016

(54) COMPUTER GENERATED SEQUENCES FOR DOWNLINK AND UPLINK SIGNALS IN WIRELESS COMMUNICATION SYSTEMS

(75) Inventors: Anand G. Dabak, Plano, TX (US); Eko N. Onggosanusi, Allen, TX (US); Aris Papasakellariou, Athens (GR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1955 days.

(21) Appl. No.: 12/108,448

(22) Filed: Apr. 23, 2008

(65) Prior Publication Data

US 2008/0267137 A1 Oct. 30, 2008

Related U.S. Application Data

(60) Provisional application No. 60/913,743, filed on Apr. 24, 2007, provisional application No. 60/914,216, filed on Apr. 26, 2007, provisional application No. 60/970,311, filed on Jul. 6, 2007, provisional application No. 60/971,470, filed on Sep. 11, 2007.

(51) Int. Cl.
*H04L 27/26* (2006.01)
*H04J 13/00* (2011.01)
*H04L 5/00* (2006.01)

(52) U.S. Cl.
CPC ......... *H04L 27/2613* (2013.01); *H04J 13/0059* (2013.01); *H04L 5/0007* (2013.01); *H04L 27/2655* (2013.01)

(58) Field of Classification Search
CPC .................................................. H04W 72/0406
USPC ......... 370/215, 281, 350, 431, 503, 514–515, 370/520
See application file for complete search history.

(56) References Cited

U.S. PATENT DOCUMENTS

| | | | |
|---|---|---|---|
| 2004/0066802 | A1 | 4/2004 | Ro et al. |
| 2007/0004465 | A1 | 1/2007 | Papasakellariou et al. |

(Continued)

OTHER PUBLICATIONS

Sharp, "Optimized UL RS Design, and Some Issues with Current UL RS Proposals", Agenda Item 7.10.2., 3GPP TSG-RAN WG1#48bis, St. Julian, Malta, Mar. 26-30, 2007, pp. 1-19.

(Continued)

*Primary Examiner* — Hassan Kizou
*Assistant Examiner* — Ashil Farahmand
(74) *Attorney, Agent, or Firm* — Ronald O. Neerings; Frank D. Cimino

(57) ABSTRACT

The present disclosure provides a base station transmitter, a user equipment transmitter and methods of operating the base station and user equipment transmitters. In one embodiment, the base station transmitter is for use with a cellular communication system and includes a synchronization unit configured to provide a randomly-generated constant amplitude zero autocorrelation (random-CAZAC) sequence corresponding to a downlink synchronization signal. Additionally, the base station transmitter also includes a transmit unit configured to transmit the downlink synchronization signal using the random-CAZAC sequence. In another embodiment, the user equipment transmitter is for use with a cellular communication system and includes a reference signal unit configured to provide a random-CAZAC sequence for an uplink reference signal corresponding to a one resource block allocation of the user equipment. The user equipment transmitter also includes a transmit unit configured to transmit the uplink reference signal using the random-CAZAC sequence.

6 Claims, 10 Drawing Sheets

(56) References Cited

U.S. PATENT DOCUMENTS

| | | | |
|---|---|---|---|
| 2007/0099639 A1* | 5/2007 | Mege et al. | 455/502 |
| 2008/0080467 A1* | 4/2008 | Pajukoski et al. | 370/342 |
| 2008/0205348 A1* | 8/2008 | Malladi | 370/335 |
| 2009/0274250 A1* | 11/2009 | Li | 375/344 |
| 2011/0212745 A1* | 9/2011 | Papasakellariou | 455/522 |

OTHER PUBLICATIONS

NTT DoCoMo, LG Electronics, Mitsubishi Electric, Panasonic, Sharp, Toshiba Corporation, Reference Signal Sequence Allocation Method in E-UTRA Uplink, Agenda Item 6.4.2., 3GPP TSG RAN WG1 Meeting #47, Riga, Latvia, Nov. 6-10, 2006, pp. 1-7.

Texas Instruments, "Uplink Reference Signal Sequence Assignments in E-UTRA", Agenda Item 7.2.2., 3GPP TSG RAN WG1 #50, Athens, Greece, Aug. 20-24, 2007, pp. 1-3.

Texas Instruments, "Design of CAZAC Sequences for Small RB Allocations in E-UTRA UL", Agenda Item 7.11.2., 3GPP TSG RAN WG1#49, Kobe, Japan, May 7-11, 2007, 6 pages.

Texas Instruments, "Design of CAZAC Sequences for Small RB Allocations in E-UTRA UL", Agenda Item 5.11.2., 3GPP TSG RAN WG1#49bis, Orlando, USA, Jun. 25-29, 2007, 8 pages.

Extended European search report dated Jun. 20, 2012 in connection with Application No. 08754942.4.

\* cited by examiner

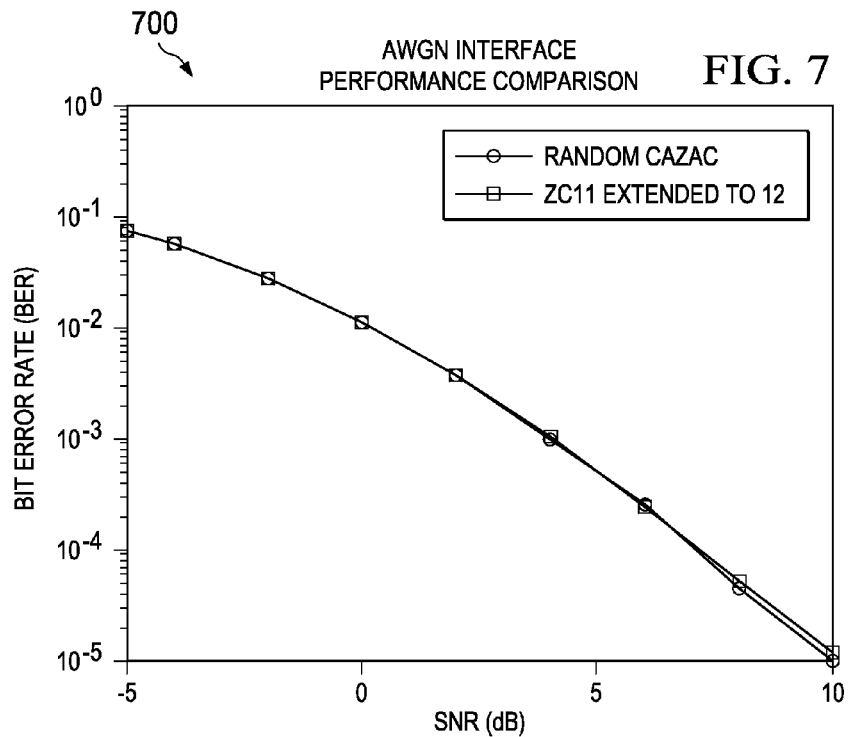
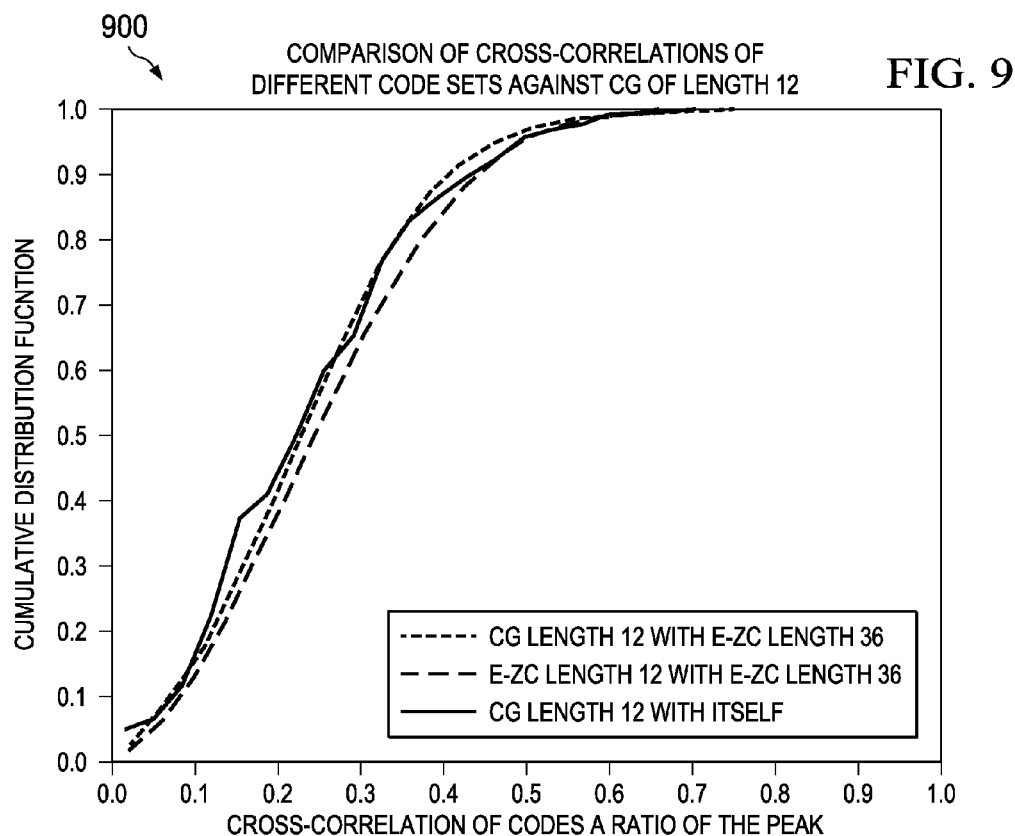

COMPUTER GENERATED SEQUENCES FOR DOWNLINK AND UPLINK SIGNALS IN WIRELESS COMMUNICATION SYSTEMS

CROSS-REFERENCE TO PROVISIONAL APPLICATION

This application claims the benefit of U.S. Provisional Application No. 60/913,743 entitled "New Design of Constant Amplitude Zero Auto-correlation (CAZAC) Sequences for Communication Systems" to Anand G. Dabak and Eke N. Onggosanusi filed on Apr. 24, 2007, which is incorporated herein by reference in its entirety.

This application also claims the benefit of U.S. Provisional Application No. 60/914,216 entitled "Design of Length 12 UL-RS for LTE Using Random Constant Amplitude Zero Auto-Correlation (CAZAC) Sequences" to Anand G. Dabak and Aris Papasakellariou filed on Apr. 26, 2007, which is incorporated herein by reference in its entirety.

This application additionally claims the benefit of U.S. Provisional Application No. 60/970,311 entitled "Design of CAZAC Sequences for Small RB Allocations in E-UTRA UL" to Anand G. Dabak and Aris Papasakellariou filed on Sep. 6, 2007, which is incorporated herein by reference in its entirety.

This application further claims the benefit of U.S. Provisional Application No. 60/971,470 entitled "Design of CAZAC Sequences for Small RB Allocations in E-UTRA UL (Update)" to Anand G. Dabak and Aris Papasakellariou filed on Sep. 11, 2007, which is incorporated herein by reference in its entirety.

TECHNICAL FIELD

The present disclosure is directed, in general, to a cellular communication system and, more specifically, to a base station transmitter, a user equipment transmitter and methods of operating the same.

BACKGROUND

In a cellular communication network, each cell employs a base station that communicates with user equipment, such as a laptop, a PDA or a cell phone that is actively located within its cell. When the user equipment is first turned on, it performs an initial cell search in order to be connected to the cellular network. This involves a downlink synchronization process between the base station and the user equipment wherein the base station sends a synchronization signal to the user equipment.

Based on channel quality indications perceived by the user equipment, communication resource blocks associated with the cellular network may be allocated to the user equipment. The number of resource blocks that are allocated depends somewhat on the number of users within the cell and the ability of their equipment to accommodate a larger number of resource blocks. The ability of the user equipment to accommodate a larger number of resource blocks improves data rates and reduces cell planning constraints. Since cellular communication systems offer great flexibility in their use, improvements would prove beneficial in the art.

SUMMARY

Embodiments of the present disclosure provide a base station transmitter, a user equipment transmitter and methods of operating the base station and user equipment transmitters. In one embodiment, the base station transmitter is for use with a cellular communication system and includes a synchronization unit configured to provide a randomly-generated constant amplitude zero autocorrelation (random-CAZAC) sequence corresponding to a downlink synchronization signal. Additionally, the base station transmitter also includes a transmit unit configured to transmit the downlink synchronization signal using the random-CAZAC sequence.

In another embodiment, the user equipment transmitter is for use with a cellular communication system and includes a reference signal unit configured to provide a randomly-generated constant amplitude zero autocorrelation (random-CAZAC) sequence for an uplink reference signal corresponding to a one resource block allocation of the user equipment. Additionally, the user equipment transmitter also includes a transmit unit configured to transmit the uplink reference signal using the random-CAZAC sequence.

In yet another embodiment, the user equipment transmitter is for use with a cellular communication system and includes a reference signal unit configured to provide a QPSK sequence for an uplink reference signal corresponding to a one or two resource block allocation of the user equipment. Additionally, the user equipment transmitter also includes a Zadoff-Chu sequence unit configured to generate a Zadoff-Chu sequence for the uplink reference signal corresponding to a resource block allocation of three or more for the user equipment. The user equipment transmitter further includes a transmit unit configured to transmit the uplink reference signal.

In another aspect, the present disclosure provides a method of operating a base station transmitter for use with a cellular communication system. The method includes providing a randomly-generated constant amplitude zero autocorrelation (random-CAZAC) sequence corresponding to a downlink synchronization signal. The method also includes transmitting the downlink synchronization signal using the random-CAZAC sequence.

The present disclosure also provides a method of operating a user equipment transmitter for use with a cellular communication system. The method includes providing a randomly-generated constant amplitude zero autocorrelation (random-CAZAC) sequence for an uplink reference signal corresponding to a one resource block allocation of the user equipment. The method also includes transmitting the uplink reference signal using the random-CAZAC sequence.

The present disclosure further provides another method of operating a user equipment transmitter for use with a cellular communication system. The method includes providing a QPSK sequence for an uplink reference signal corresponding to a one or two resource block allocation of the user equipment. The method also includes generating a Zadoff-Chu sequence for the uplink reference signal corresponding to a resource block allocation of three or more for the user equipment. The method further includes transmitting the uplink reference signal.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIG. 7 illustrates a bit error rate comparison between a random-CAZAC sequence and a Zadoff-Chu sequence in the presence of AWGN interference;

FIG. 9 illustrates cumulative distribution functions of all cyclic shift cross-correlations for QPSK sequence of length 12 with itself, with of extended ZC sequences of length 36 and of extended ZC of length 12 with 36;

DETAILED DESCRIPTION

Figure 1A:
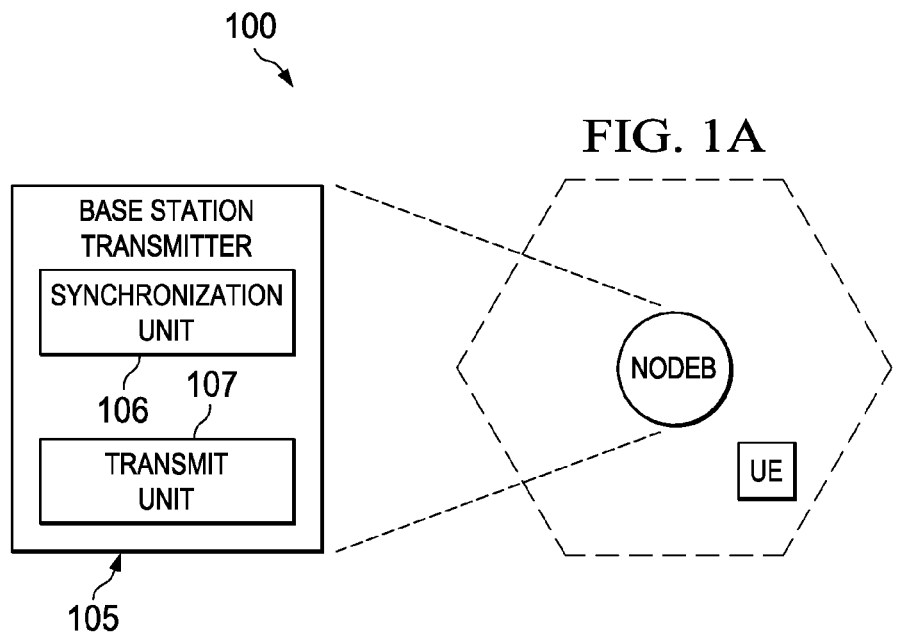
FIGS. 1A and 1B illustrate embodiments of a cellular network constructed according to the principles of the present disclosure.

Constant amplitude zero auto correlation (CAZAC) sequences are very important in cellular communication systems because they facilitate the timing detection of a signal. The constant amplitude (CA) property ensures appropriate power amplifier efficiency and the zero auto-correlation (ZAC) property ensures that the correct timing is detected. Further the ZAC property is also important in equalization of communication systems because the channel estimate that is obtained from the sequence has a flat spectrum in the frequency domain.

Zadoff-Chu sequences are typical of CAZAC sequences that are currently employed in cellular communication systems for first-stage downlink synchronization. However one of the problems with employing the Zadoff-Chu sequence in this role is that it exhibits a time-frequency ambiguity or uncertainty.

The time-frequency ambiguity may also be understood by looking at the Zadoff-Chu sequence $$S(n) = e^{\left(j\frac{\pi M n^2}{N}\right)},$$

where n is time, N is the length of the sequence and M is the sequence number. Now, consider a timing error $\delta$ in the code position $$S(n-\delta) = e^{\left(j\frac{\pi M(n-\delta)^2}{N}\right)} = e^{\left(j\frac{\pi}{N}M(n^2 - 2n\delta + \delta^2)\right)}. \quad (1)$$

Similarly, consider a frequency error $\Omega$ in the code $$e^{-j2\pi\Omega n}S(n) = e^{\left(j\left(\frac{\pi M n^2}{N} - 2\Omega n\right)\right)}, \quad (2)$$

where $$\Omega = \frac{\Delta f}{f_{samp}},$$

$\Delta f$ is the frequency estimation error in Hz and $f_{samp}$ is the sampling frequency in Hz. For a first stage acquisition in a 3GPP LTE system, for example, the $f_{samp}$ is 1.96 Msamples/second. Comparing equations (1) and (2), it may be seen that the timing error $\delta$ in code position detection implies an equivalent frequency error of $$\frac{2\pi M \delta n}{N} = 2\pi \Omega n \quad (3)$$

$$\Rightarrow \Delta f = \frac{M \delta f_{samp}}{N}.$$

If the first stage of LTE acquisition is run with a correlator at 2× sampling of the input signal, then for worst case $$\delta = \frac{1}{2}$$

and $f_{samp}$=1.96e6, N=64, M=1, the worst case frequency offset error is given by 15.3 kHz. For a 5 ppm crystal at center frequency of 2 GHz, the maximum frequency offset can be plus or minus 10 kHz. This implies that if there is small timing error detection in the first stage of a primary synchronization code (PSC) detection, the estimated frequency error can be more than that expected from the crystal offset. Hence, making a frequency correction in the first stage of acquisition may actually be more detrimental than helpful to a receiver operating in this environment.

A major constraint in the current E-UTRA design is the number of CAZAC sequences for small resource block (RB) allocations. Particularly for the case of one RB, the structure of an uplink reference signal (UL-RS) was changed from two short blocks to one long block per slot in order to accommodate a maximum of 12 instead of six CAZAC sequences. However, critical issues remain.

Truncating a length 13 Zadoff-Chu sequence can result in 12 CAZAC sequences wherein six of the sequences have a cubic metric (CM) substantially larger that QPSK by as much as 1.15 dB. This is a serious problem particularly for the ACK/NAK and possibly for channel quality indication (CQI) transmissions that rely entirely on the transmission of CAZAC sequences.

Cyclic extension of a length 11 ZC sequence provides better CM properties than truncation, although four of the 10 resulting sequences still have CM up to 0.3 dB greater that QPSK. However, communication cell planning or possible sequence hopping is further inhibited by the smaller number (10) of total sequences.

Cell or base station planning in E-UTRA for the allocation of 10 or 12 CAZAC sequences seems necessary as sequence hopping results in a relative large collision probability due to the small number of total sequences employing either extension or truncation. The small number of sequences imposes the need for tighter planning.

The issues discussed above become even more serious in the case of ACK/NAK and possibly CQI signaling due to the slow BER requirements (especially for the NAK) and the use of all cyclic shifts within the same cell. Then, in order to distinguish ACK/NAK transmission from user equipments (UEs) near the border of two cells of the same Node B, different CAZAC sequences are likely required.

Considering that only 10 or 12 such sequences are available (with only six having CM less that QPSK) and that planning is already challenging even with Node B specific sequences, it becomes apparent that having cell specific sequences is an extremely difficult challenge particularly if the Node Bs have a variable number and non-perfectly shaped cells. Moreover, as the CM for some of the sequences is larger than QPSK, coverage is limited by the ACK/NAK and not by the data transmission of one RB, which has a much larger target BER due to the potential of very low coding rate (e.g., for 10 percent BLER and HARQ).

To overcome these limitations, embodiments of the present disclosure employ randomly-generated CAZAC sequences (herein denoted as random-CAZAC sequences) or computer generated QPSK sequences that do not exhibit this time-frequency ambiguity or uncertainty and allow a larger number of sequences to be provided.

Figure 1B:
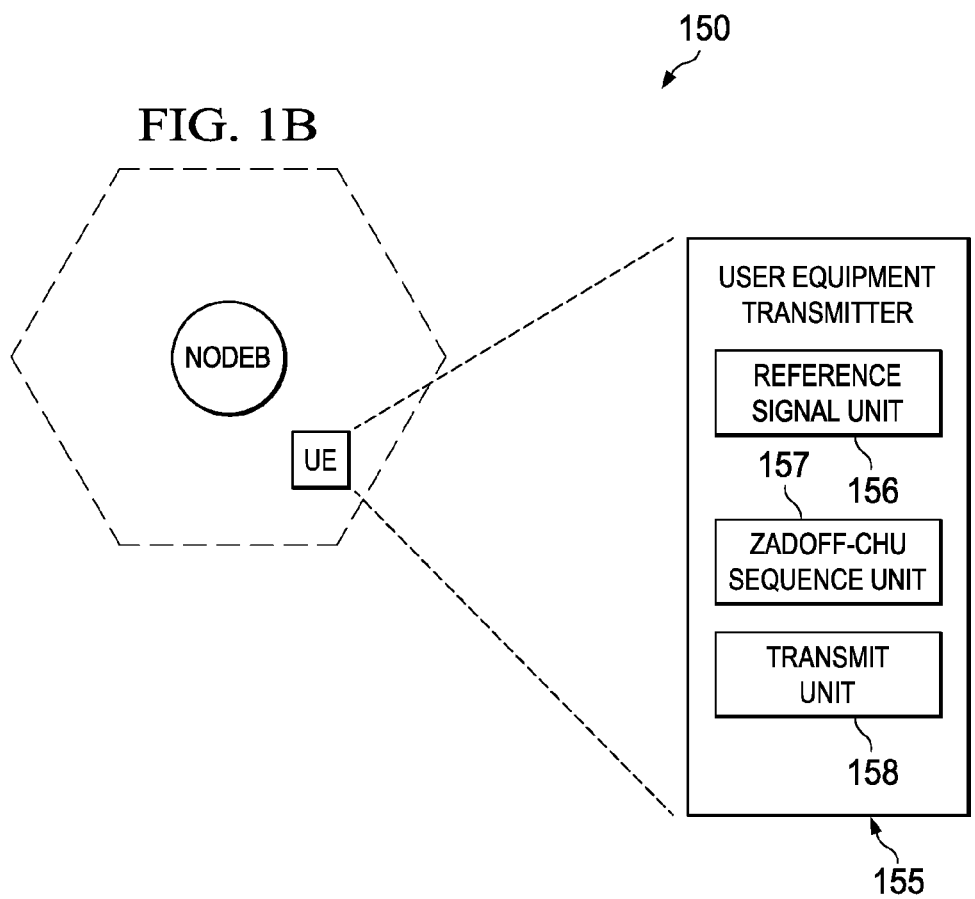

FIGS. 1A and 1B illustrate embodiments of a cellular communication network, generally designated 100 and 150, constructed according to the principles of the present disclosure. In FIG. 1A, the cellular communication network 100 shows a diagram of an embodiment wherein a base station (Node B) employs a base station transmitter 105 to provide a downlink synchronization signal to user equipment (UE). The base station transmitter 105 includes a synchronization unit 106 and a transmit unit 107 to provide the downlink synchronization signal to the UE.

In the illustrated embodiment, the synchronization unit 106 is configured to provide a randomly-generated constant amplitude zero autocorrelation (random-CAZAC) sequence corresponding to the downlink synchronization signal. Additionally, the transmit unit 107 is configured to transmit the downlink synchronization signal using the random-CAZAC sequence. In this particular embodiment, the downlink synchronization signal is a primary synchronization signal.

The random-CAZAC sequences are not chirp-like sequences, such as the Zadoff-Chu sequences, and therefore, do not exhibit the time-frequency ambiguity, as noted earlier. Examples of the random-CAZAC sequences included in this disclosure were generated by computer search. The procedure for generating the random-CAZAC sequences of length N may be described as follows.

(1) Let i=1, in a first step generate N random complex numbers $\tilde{X}_i^f = \{\tilde{x}_i^f(1), \tilde{x}_i^f(2), \ldots, \tilde{x}_i^f(n), \ldots, \tilde{x}_i^f(N)\}$.

(2) Next, define the sequence $$X_i^f = \{x_i^f(1), x_i^f(2), \ldots, x_i^f(n), \ldots, x_i^f(N)\} \quad (4)$$
$$= \left\{ \frac{\tilde{x}_i^f(1)}{|\tilde{x}_i^f(1)|}, \frac{\tilde{x}_i^f(2)}{|\tilde{x}_i^f(2)|}, \ldots, \frac{\tilde{x}_i^f(n)}{|\tilde{x}_i^f(n)|}, \ldots, \frac{\tilde{x}_i^f(N)}{|\tilde{x}_i^f(N)|} \right\}.$$

(3) Now, let the sequence $\tilde{X}_i^t = \{\tilde{x}_i^t(1), \tilde{x}_i^t(2), \ldots, \tilde{x}_i^t(N)\}$ be the IFFT of sequence $X_i^f$. Then, define the sequence $$X_i^t = \{x_i^t(1), x_i^t(2), \ldots, x_i^t(n), \ldots, x_i^t(N)\} \quad (5)$$
$$= \left\{ Q_k\left(\frac{\tilde{x}_i^t(1)}{\tilde{x}_i^t(1)}\right), Q_k\left(\frac{\tilde{x}_i^t(2)}{\tilde{x}_i^t(2)}\right), \ldots, Q_k\left(\frac{\tilde{x}_i^t(n)}{\tilde{x}_i^t(n)}\right), \ldots, Q_k\left(\frac{\tilde{x}_i^t(N)}{\tilde{x}_i^t(N)}\right) \right\},$$

where $Q_K(y);y$ is a complex scalar number of unit amplitude that denotes the quantization of the phase of y to $$\frac{k\pi}{K}; k = 0, 1, 2, \ldots, K-1$$

using either a round off, floor or ceiling function. As K→∞, no quantization of the phase is done in the limit. This quantization of phase is introduced if one wants to limit the resulting sequence $X_M^t$ phases from lying any where on the unit circle.

(4) Let the FFT of the sequence $X_i^t$ be now denoted by $\tilde{X}_i^f$, set i=i+1 and now go back to step (2). Repeat the above steps (2), (3) and (4) for say M=1000 or more.

For a large number of iterations where K>>1, (e.g., for K=4096), the resulting sequence $X_M^t$ is a random-CAZAC sequence. Further, several such random-CAZAC sequences can be generated by starting with a different random sequence in step (1) above. For finite K, the resulting sequence $X_i^t$ still has good autocorrelation properties, however the autocorrelation may not be zero like the actual CAZAC sequence. Conversely it implies that the frequency domain characteristic may not be exactly flat. For K=16, an approximately 3 dB peak to peak ripple in the frequency domain may be observed, while for K=32, a 2 dB ripple in the frequency domain may be observed. Several other interesting properties of the randomly generated CAZAC sequences (K>>1) are discussed below.

Generally, upon convergence and as discussed earlier, the autocorrelation of the generated random-CAZAC sequences is a delta function, and it provides constant amplitude elsewhere in the time domain. Additionally, the frequency domain spectrum is substantially completely flat.

Figure 2:
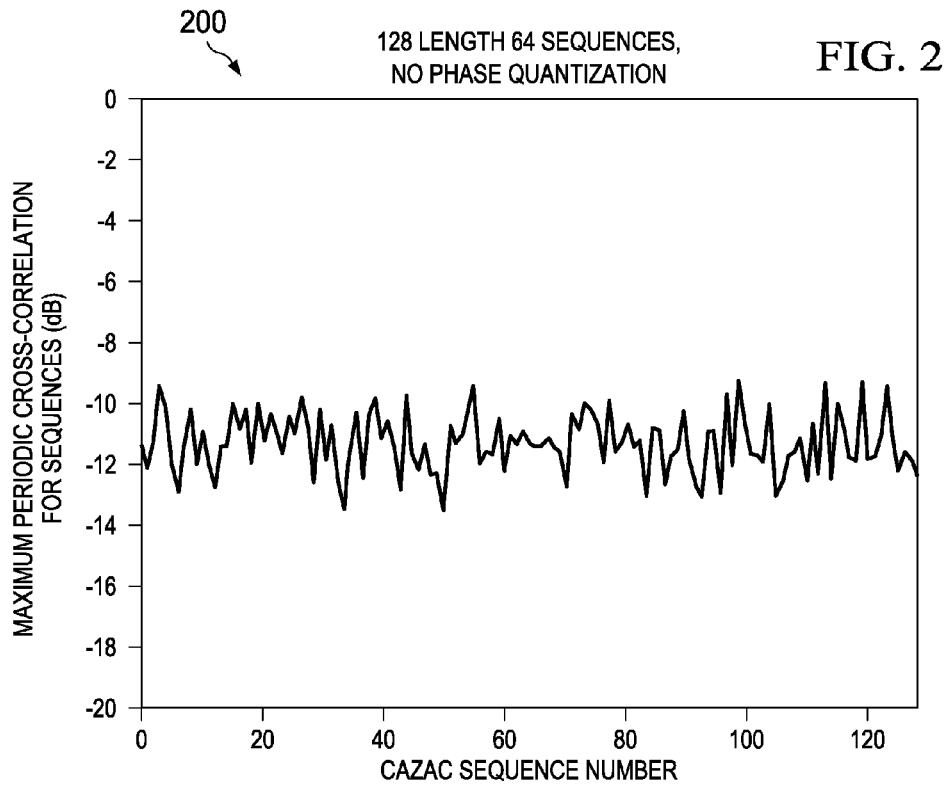
FIG. 2 illustrates a typical maximum periodic correlation for an embodiment of 128 random-CAZAC sequences of length 64 constructed according to the principles of the present disclosure.

FIG. 2 illustrates a graph 200 showing a typical maximum periodic correlation for an embodiment of 128 random-CAZAC sequences of length 64 constructed according to the principles of the present disclosure. The cross correlation properties of different random-CAZAC sequences $X_i^t$ and for different i are quite good. For N=64, the maximum periodic autocorrelation between the different random-CAZAC sequences is about 18 most of the time, while it could go as high as 30 when only 500 random-CAZAC sequences are generated.

Figure 3B:
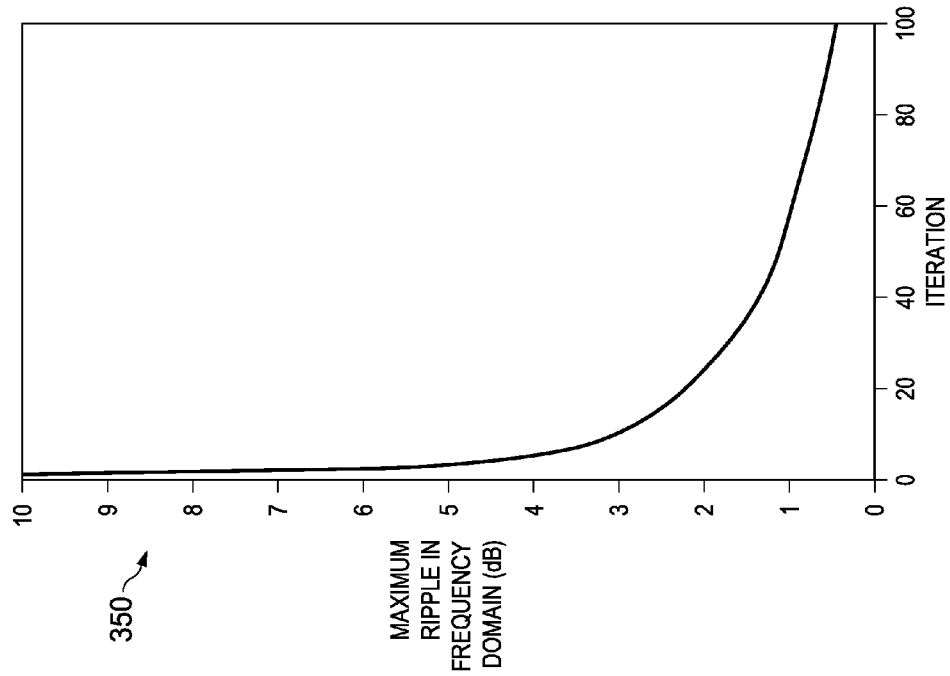
FIGS. 3A and 3B illustrate examples of ripple in the time and frequency domains, respectively.
Figure 3A:
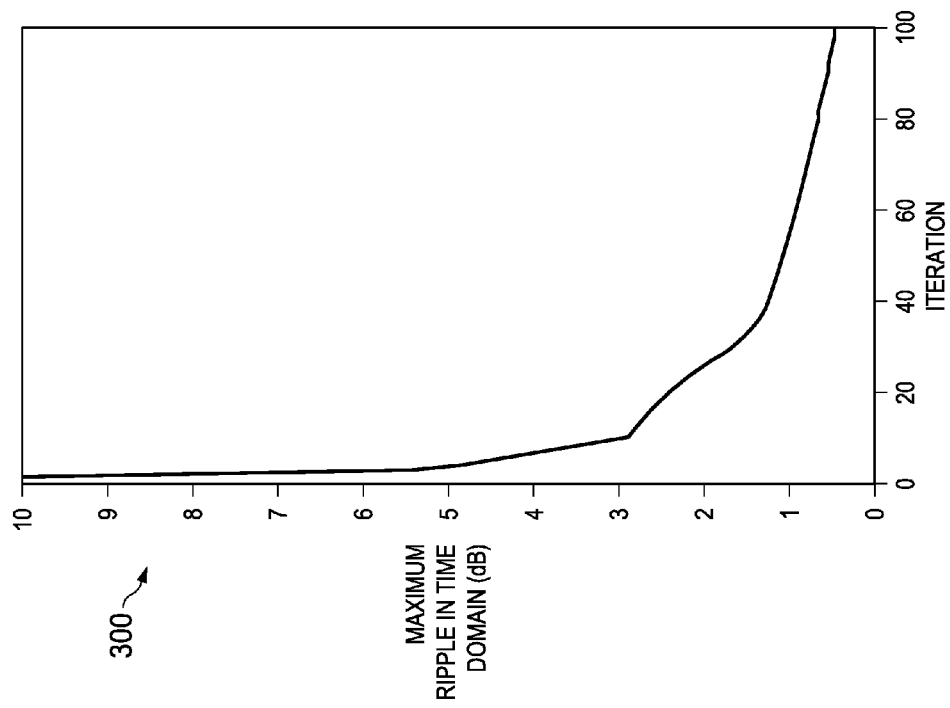

FIGS. 3A and 3B illustrate graphs 300, 350 showing examples of ripple in the time and frequency domains, respectively. The ripple may be defined in the time and frequency domains for every step i as $$r_i^t = 20*\log10\left(\frac{\max(\text{abs}(x_i^t(n)))}{\min(\text{abs}(\tilde{x}_i^t(n)))}\right);$$

$$r_i^f = 20*\log10\left(\frac{\max(\text{abs}(\tilde{x}_i^f(n)))}{\min(\text{abs}(\tilde{x}_i^f(n)))}\right).$$

(6)

These may be seen to decrease monotonically in both the time and frequency domains as the number of iterations increase.

Table 1 enumerates some of the different sequences that have been generated for N=64 and for K=16 and K=32 respectively. Since all sequences are constant amplitude, only the phase is shown as a ratio of $$\frac{\pi}{16}$$

and $$\frac{\pi}{32}$$

respectively. The codes in columns 1-5 are the codes for K=16, and those in columns 6-10 are for K=32. For example, the phase value of the first code (1) and the first sample 15 corresponds to a phase of $$\frac{15*\pi}{16},$$

which represents 168.75 degrees.

TABLE 1

Random codes for phase quantization $\frac{\pi}{16}$ (K = 16) and $\frac{\pi}{32}$ (K = 32)

| | 1 | 2 | 3 | 4 | 5 | 6 | 7 | 8 | 9 | 10 |
|---|---|---|---|---|---|---|---|---|---|---|
| 1 | 15 | 10 | 2 | 9 | −6 | −11 | 8 | 10 | 11 | −4 |
| 2 | −6 | −14 | −8 | 12 | 3 | −28 | −18 | −13 | 18 | 0 |
| 3 | −14 | −9 | 5 | 6 | 5 | 29 | 32 | 21 | 11 | 3 |
| 4 | −11 | 14 | −2 | −6 | −5 | 26 | −12 | −10 | 16 | −16 |
| 5 | 14 | −10 | −10 | −12 | 5 | −31 | −9 | 9 | −13 | 23 |
| 6 | 8 | 6 | 8 | 3 | 10 | 14 | 30 | 1 | 3 | 19 |
| 7 | −11 | −2 | 10 | 3 | 15 | −9 | −25 | 18 | 4 | 18 |
| 8 | 1 | 1 | 13 | −13 | −1 | −11 | −18 | 20 | 16 | −10 |
| 9 | 4 | 12 | −9 | −12 | −1 | 19 | 3 | −27 | −25 | 16 |
| 10 | −11 | −9 | −14 | 8 | −12 | −12 | −2 | −23 | −24 | 26 |
| 11 | −5 | −4 | 12 | 0 | 6 | 20 | 26 | −12 | 13 | −16 |
| 12 | 6 | 2 | 3 | 9 | −16 | −18 | −19 | −11 | −5 | 31 |
| 13 | 10 | −3 | 11 | 2 | 3 | 24 | 4 | 28 | −5 | 19 |
| 14 | 13 | 11 | 10 | −6 | 1 | −16 | −25 | −26 | 28 | −9 |
| 15 | 3 | 12 | 7 | 2 | 9 | −21 | 6 | 17 | −17 | 22 |
| 16 | 11 | 3 | −11 | −6 | 10 | −5 | 8 | 1 | −27 | 0 |
| 17 | 3 | 3 | −13 | −6 | −13 | 3 | 1 | −28 | −3 | −30 |
| 18 | 11 | −14 | 14 | 2 | 10 | 12 | 3 | −11 | −13 | −30 |
| 19 | 14 | 15 | 8 | 9 | −8 | 17 | −15 | 9 | −17 | −26 |
| 20 | 4 | 13 | 13 | −12 | −1 | −31 | −10 | 17 | 8 | 31 |
| 21 | 2 | −2 | 9 | −7 | 7 | −31 | −2 | 8 | −2 | −20 |
| 22 | 9 | 3 | −1 | −14 | 4 | −18 | −16 | 9 | 23 | −18 |
| 23 | −7 | 10 | 4 | −16 | −4 | 20 | 12 | 30 | 5 | 12 |
| 24 | −13 | 2 | −6 | 11 | 7 | −24 | −9 | −16 | 25 | 7 |
| 25 | 12 | −7 | −1 | 5 | 14 | −32 | 12 | 17 | 17 | −6 |
| 26 | −6 | 5 | 7 | 15 | 13 | −28 | 17 | 29 | 23 | 17 |
| 27 | 12 | −2 | 15 | −10 | 7 | 10 | 6 | 9 | −4 | 16 |
| 28 | −15 | 0 | −6 | 14 | 1 | −7 | 2 | −10 | −8 | −6 |
| 29 | −3 | −5 | −7 | −13 | 7 | −10 | −23 | 19 | −26 | −18 |
| 30 | −14 | 4 | 12 | −16 | 10 | 11 | −29 | 30 | 0 | −7 |
| 31 | 7 | −10 | −12 | 6 | −5 | −24 | −8 | 3 | 25 | −21 |
| 32 | 3 | 10 | 1 | −7 | 15 | 3 | 27 | −10 | 28 | 25 |
| 33 | −12 | 1 | −10 | 16 | −6 | 18 | −11 | 30 | 28 | 22 |
| 34 | 5 | 6 | 4 | −15 | 3 | −18 | 0 | 23 | 12 | −24 |
| 35 | 10 | 16 | 12 | 0 | −5 | −6 | −23 | −22 | −31 | −13 |
| 36 | 6 | −2 | −10 | −15 | −5 | 11 | 6 | −11 | 2 | −29 |
| 37 | 2 | −2 | 8 | −6 | −12 | −21 | −23 | 11 | 21 | −22 |
| 38 | 6 | −12 | 5 | −9 | −15 | 31 | 31 | 28 | 12 | 28 |
| 39 | −9 | −14 | −11 | 11 | −3 | 4 | −12 | 7 | −23 | −15 |
| 40 | −13 | 2 | 9 | −3 | −4 | −21 | 9 | 12 | 19 | −11 |
| 41 | 10 | 14 | −8 | 9 | −9 | 21 | −14 | −4 | 22 | −25 |
| 42 | 0 | 0 | 15 | −11 | 15 | 16 | −28 | 11 | 23 | 24 |
| 43 | 12 | 3 | −9 | −8 | −3 | 9 | 17 | −14 | 17 | 24 |
| 44 | −10 | 6 | −10 | 13 | 14 | −12 | −20 | −3 | −13 | −23 |
| 45 | 14 | 0 | −9 | −4 | −1 | −8 | 1 | −16 | 2 | 9 |
| 46 | 4 | 9 | −14 | 13 | 11 | 19 | 2 | −24 | 27 | 17 |

TABLE 1-continued

Random codes for phase quantization $\frac{\pi}{16}(K = 16)$ and $\frac{\pi}{32}(K = 32)$

| | 1 | 2 | 3 | 4 | 5 | 6 | 7 | 8 | 9 | 10 |
|---|---|---|---|---|---|---|---|---|---|---|
| 47 | −6 | 8 | 5 | 16 | −5 | 1 | 10 | 20 | −23 | 30 |
| 48 | 11 | −12 | 16 | 6 | −5 | −20 | −23 | 6 | −4 | −14 |
| 49 | 14 | −2 | −6 | −3 | 11 | −11 | 30 | 28 | 24 | 22 |
| 50 | 10 | −11 | −2 | 6 | −8 | 2 | 30 | 4 | 14 | −11 |
| 51 | −7 | 6 | 15 | −13 | 1 | 16 | 25 | −24 | −6 | 29 |
| 52 | 2 | −3 | 13 | −2 | 3 | −11 | −18 | −32 | 27 | −16 |
| 53 | 6 | 1 | 13 | −12 | 10 | −3 | −28 | 30 | 18 | −26 |
| 54 | 4 | 11 | 9 | 9 | 6 | −25 | 25 | −26 | 22 | −6 |
| 55 | −12 | −6 | −7 | 14 | −8 | −32 | −1 | 12 | −12 | 14 |
| 56 | −15 | 13 | 15 | 12 | 7 | −31 | 7 | 25 | −6 | −31 |
| 57 | −12 | 8 | −12 | −11 | 0 | 21 | 15 | −25 | −22 | 3 |
| 58 | −13 | 1 | 1 | −10 | −4 | 13 | −30 | 25 | −6 | 25 |
| 59 | −4 | 13 | −7 | −4 | −15 | −31 | 2 | −11 | −30 | −9 |
| 60 | −1 | −5 | 1 | −14 | 15 | −28 | −4 | 30 | −16 | −24 |
| 61 | −4 | −15 | 15 | −9 | −12 | −8 | −1 | 27 | 16 | 13 |
| 62 | 2 | −8 | 14 | −1 | 11 | −31 | −4 | −30 | 9 | 12 |
| 63 | −16 | −10 | −11 | 3 | 10 | −28 | 31 | −20 | −12 | 16 |
| 64 | −5 | 14 | −2 | 9 | −1 | 31 | 26 | −31 | 27 | −17 |

Referring again to FIG. 1A and in the context of an LTE system, three primary synchronization sequences (PSCS) are used to facilitate timing acquisition, frequency offset estimation and partial cell identification. In this case, it is important to keep the UE receiver complexity small. While three sequences can be used for this application, it is beneficial to exploit inherent properties of CAZAC sequences to reduce complexity.

Since the proposed random-CAZAC sequences are complex-valued and statistically behave similar to pseudo-noise (PN) sequences, it is expected that the complex conjugate of a particular random CAZAC sequence S*(n) has small cross-correlation with the original sequence S(n). This property can be exploited to generate two sequences from one random-CAZAC sequence S(n), which have small cross-correlation properties. It is apparent that the autocorrelation profile of S(n) and S*(n) are identical. If quantized correlation is used, it is also expected that the profile for S*(n) is similar to S(n). Moreover, exploiting this property will result in a receiver complexity reduction. This is because the correlation between the received signal R(n) with S(n) shares the same terms as that with S*(n). Hence, only one correlation computation is needed for the two sequences.

Furthermore, it is also possible to modulate S(n) with some regular phase rotation, for example exp(j*θ*n)S(n), to generate more sequences (where θ is a constant phase shift such as $$\frac{\pi}{2}$$

or π). While this extension can generate even more sequences from one random-CAZAC sequence with small cross-correlation properties, the complexity reduction is minimal, if any, compared to the above complex conjugate extension.

Keeping the above in mind, it is possible to generate three primary synchronization sequences from two random-CAZAC sequences generated by the procedure presented above. That is $$PSC_1(n) = S_1(n) \qquad (7)$$
$$PSC_2(n) = S_1^*(n)$$
$$PSC_3(n) = S_2(n).$$

It is also possible to replace $S_2(n)$ with $S_2^*(n)$ for $PSC_3(n)$. The above construction only requires two correlations as opposed to three, which results in a 25 percent reduction in computational complexity.

The three PSCs designed with the above construction are advantageously defined in the time domain. That is, the length N PSC sequence is modulated with a certain waveform (e.g., SRRC, Gaussian, etc.). The waveform is intended to define the spectrum characteristic of the sequence and chosen to meet the spectrum mask. After modulating with the waveform, cyclic prefix is added to emulate an OFDMA symbol. Then, the resulting symbol is time multiplexed with other OFDMA symbols within the defined sub-frame. Similarly, the DC term is subtracted from the codes in order to ensure a zero term at the DC.

In FIG. 1B, the cellular network 150 shows a diagram of an embodiment wherein user equipment (UE) employs a user equipment transmitter 155 to provide an uplink reference signal to the Node B. The user equipment transmitter 155 includes a reference signal unit 156, a Zadoff-Chu sequence unit 157 and a transmit unit 158 to provide the uplink reference signal to the Node B.

In one embodiment, the reference signal unit 156 is configured to provide a randomly-generated constant amplitude zero autocorrelation (random-CAZAC) sequence for an uplink reference signal corresponding to a one resource block allocation of the user equipment. Additionally, the random-CAZAC sequence may be extended to correspond to a two resource block allocation of the user equipment. The Zadoff-Chu sequence unit 156 is configured to generate the uplink reference signal corresponding to a three or more resource block allocation for the user equipment. The transmit unit 158 is configured to transmit the uplink reference signal.

The random-CAZAC sequences for one or two RB allocations are generated employing the procedure discussed with respect to FIG. 1A above. More than 30 such sequences may be obtained for one RB allocation wherein all have a CM lower than QPSK and mean cross-correlations similar to the one achieved with just 10 or 12 sequences resulting from the Zadoff-Chu extension or truncation, respectively.

Nevertheless, for greater than three RB allocations where many Zadoff-Chu generated sequences exist satisfying the above properties, Zadoff-Chu extension or truncation may still be used as a specific formula exists for the generation of Zadoff-Chu sequences for the prime length employing simple and singular circuitry for large RB allocations.

Figure 4A:
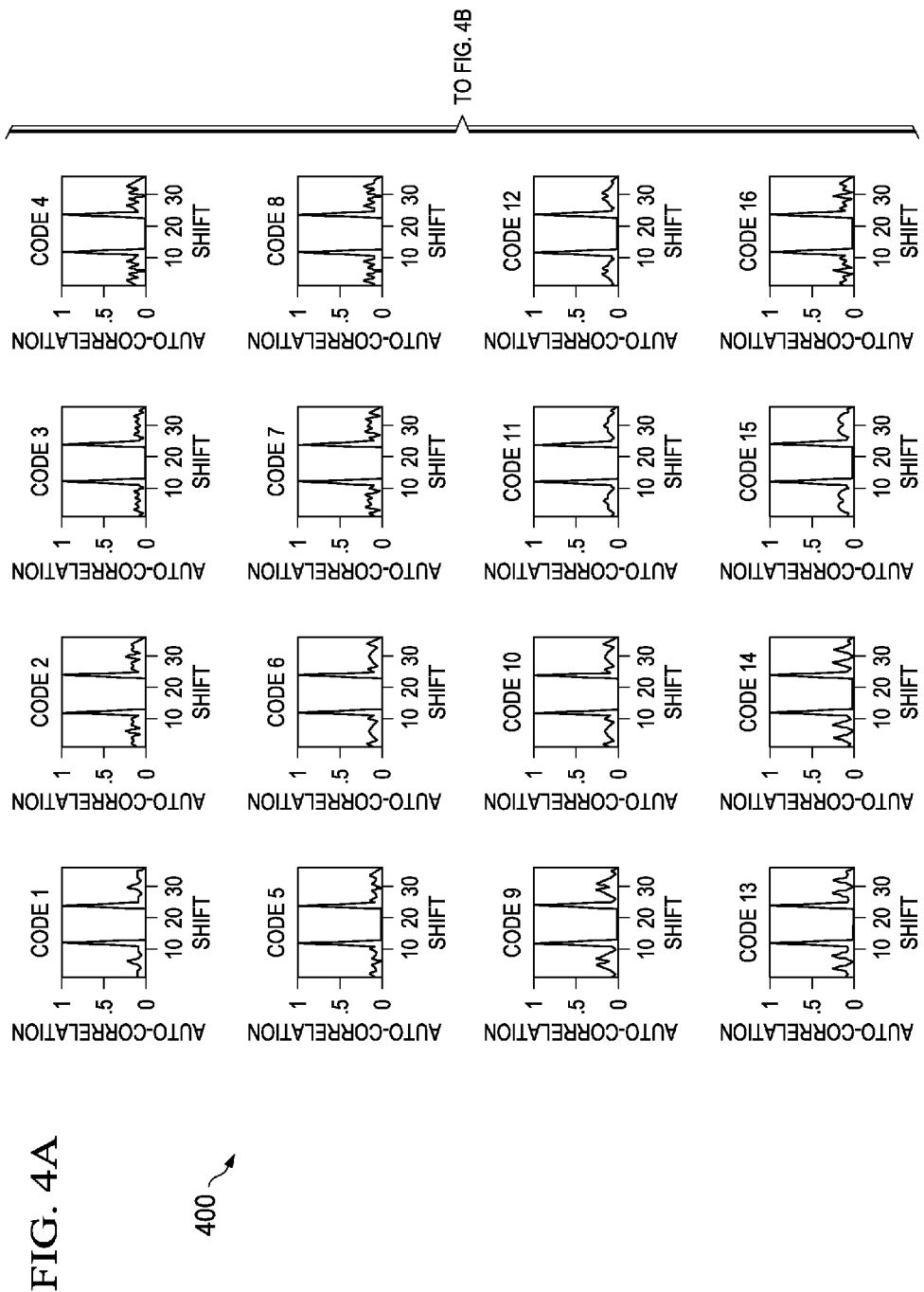
FIGS. 4A and 4B illustrate periodic autocorrelations of 32 respective random-CAZAC sequences wherein each of the codes shown have a zero autocorrelation.
Figure 4B:
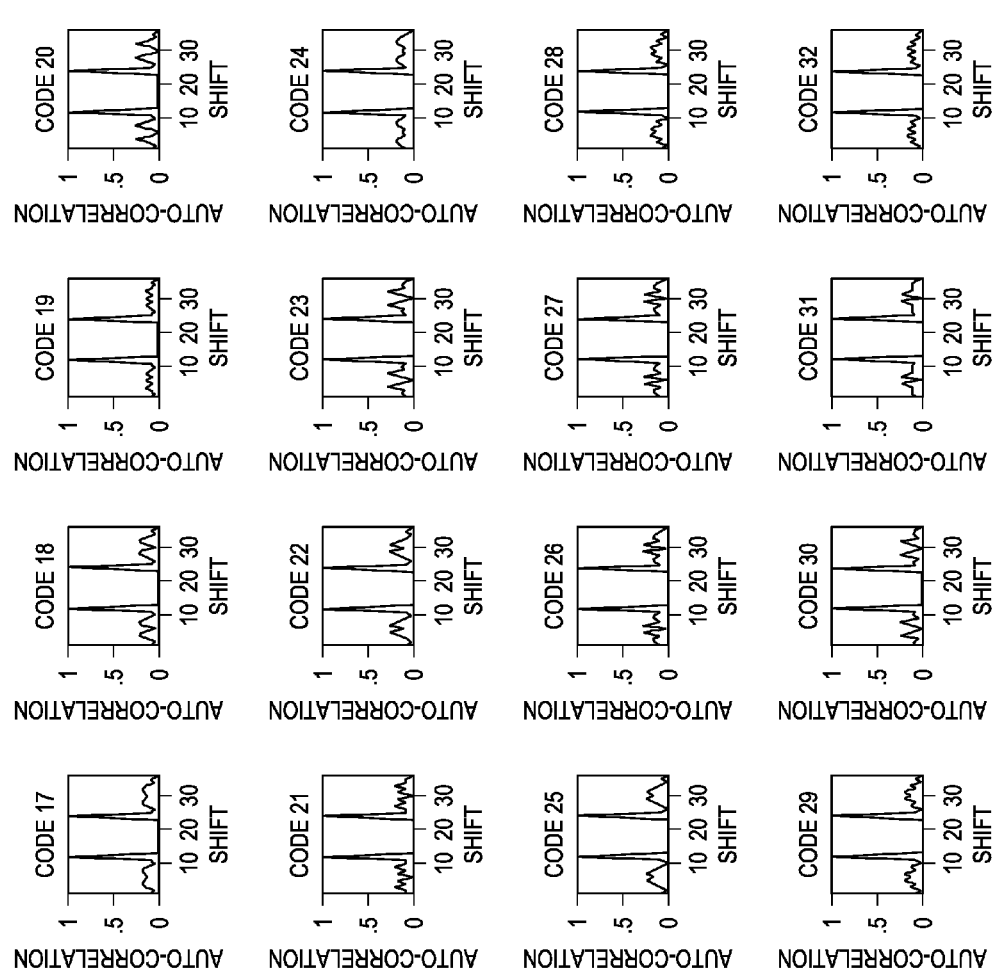

FIGS. 4A and 4B illustrate a graph 400 showing periodic autocorrelations of 32 respective random-CAZAC sequences wherein each of the codes shown have a zero autocorrelation. Several thousand random-CAZAC codes may be found by starting from the random initialization in step (1) of the procedure discussed with respect to FIG. 1A. Approximately 30,000 random-CAZAC sequences were generated from the above procedure and then sorted according to their CM properties. Additionally, they were sorted according to the periodic cross-correlation over the whole sequence. This alleviates a problem where cyclic shifts of the same sequence may be used by different UEs in a cell or in different cells of the same Node B. A total of 33 sequences were obtained, which are identified to have good CM and cross-correlation properties. The CMs of these sequences are lower than the CM of QPSK.

Table 2 summarizes the different statistical properties for the UL-RS generated using random-CAZAC sequences and those generated using Zadoff-Chu (ZC) sequences. The first two columns show the cyclic periodic cross-correlation properties. The last three columns show the CM properties.

Figure 5:
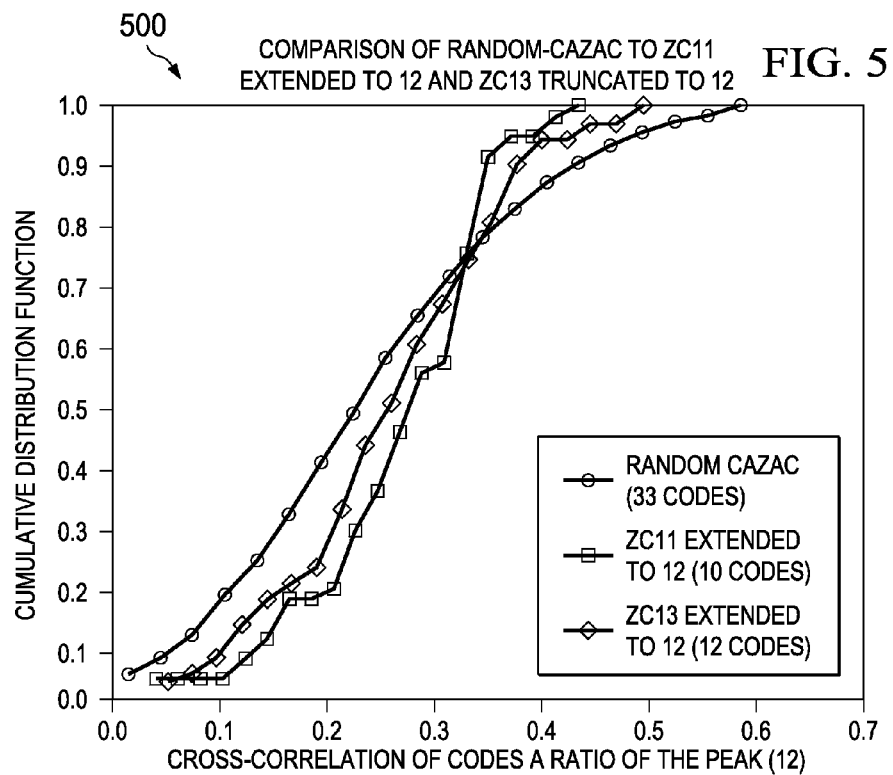
FIG. 5 illustrates cumulative distribution functions of cross-correlations for random-CAZAC sequences and extended or truncated Zadoff-Chu sequences.

FIG. 5 illustrates a graph 500 showing cumulative distribution functions of cross-correlations for random-CAZAC sequences and extended or truncated Zadoff-Chu sequences. Graph 500 shows a comparison of the random-CAZAC sequence to a ZC11 sequence extended to 12 and ZC13 sequence truncated to 12.

Figure 6A:
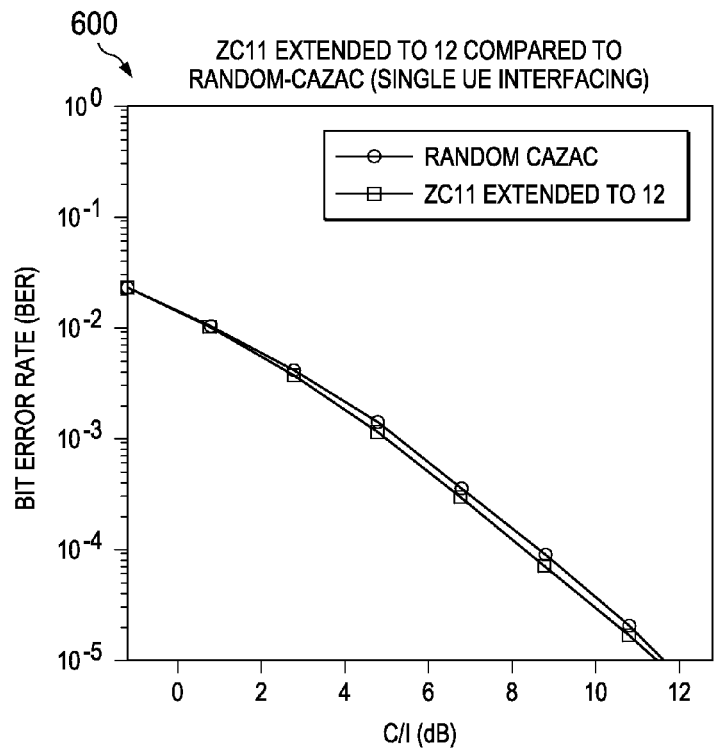
FIGS. 6A and 6B illustrate bit error rate comparisons for random-CAZAC sequences and extended Zadoff-Chu sequences.
Figure 6B:
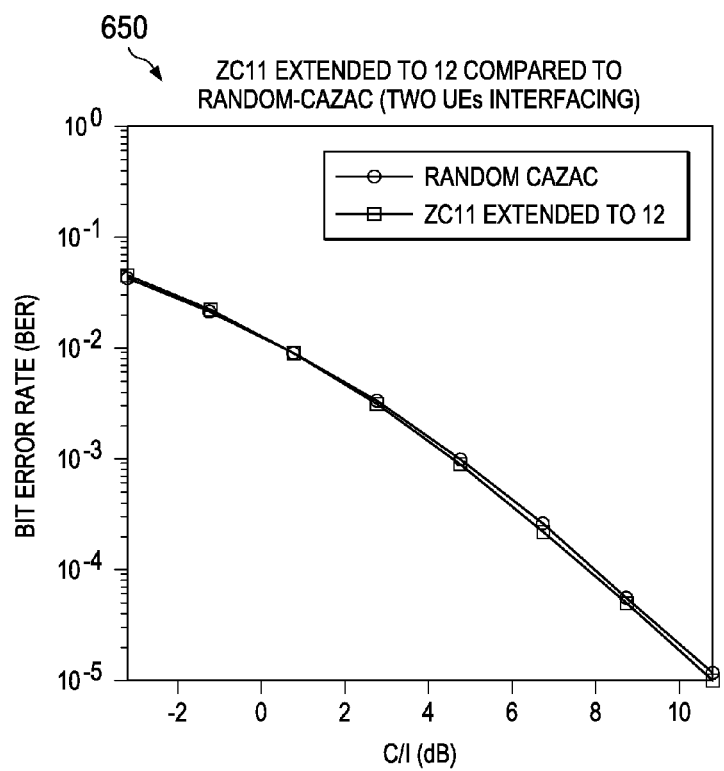

FIGS. 6A and 6B illustrate graphs 600 and 650 showing bit error rate comparisons for random-CAZAC sequences and extended Zadoff-Chu sequences. The graph 600 corresponds to a single interfering UE, and the graph 650 corresponds to two interfering UEs. The bit error rate (BER) results are for an ACK/NAK transmission with sequence hopping between two slots and flat fading, for maximum impact. For the worst case of a single dominant interferer, the performance loss from the random CAZAC sequence is only 0.35 dB at 0.01% BER. With two equal-power interferers, the loss at 0.01% BER reduces to 0.2 dB. In both cases, the loss is negligible at higher BERs. In the presence of additional cyclic shift hopping per symbol and orthogonal cover sequence hopping, the interference is expected to be further randomized implying that the loss will be further reduced as compared to that shown in FIGS. 6A and 6B.

FIG. 7 illustrates a graph 700 showing a bit error rate comparison between a random-CAZAC sequence and a Zadoff-Chu sequence in the presence of AWGN interference. Here, the Zadoff-Chu sequence is a ZC11 extended to 12. The graph 700 confirms the trend in performance loss reduction from adding interferers stated above with respect to FIGS. 6A and 6B. No performance difference is observed between the Random CAZAC and extended ZC sequences.

Salient advantages of an UL-RS designed using Random-CAZAC sequences may be summarized as follows. If only 10 UL-RS sequences are needed (as for ZC sequences with extension), the worst case CM of the UL-RS employing a

TABLE 2

Statistics of UL-RS generated with ZC extension or truncation and random-CAZAC sequences.

| | Total number of sequences | Mean cross-correlation | Square root mean square cross correlation | Mean CM | Min CM | Max CM | Number of Sequences with CM less than or equal to QPSK (1.22) |
|---|---|---|---|---|---|---|---|
| ZC Cyclic Extension | 10 | 0.28 | 0.29 | 0.85 | 0.17 | 1.50 | 6 |
| ZC Truncation | 12 | 0.27 | 0.29 | 1.37 | 0.46 | 2.36 | 6 |
| Random-CAZAC Sequences 1-10 | 10 | 0.26 | 0.29 | 0.46 | 0.14 | 0.61 | 10 |
| Random-CAZAC Sequences 1-16 | 16 | 0.26 | 0.29 | 0.56 | 0.14 | 0.77 | 16 |
| Random-CAZAC Sequence 1-24 | 24 | 0.26 | 0.29 | 0.67 | 0.14 | 0.95 | 24 |
| Random-CAZAC Sequences 1-33 | 33 | 0.26 | 0.29 | 0.78 | 0.14 | 1.22 | 33 |

As can be seen from Table 2, the UL-RS designed using random-CAZAC sequences have similar (or slightly smaller) mean cross-correlation and mean square cross-correlation as those designed with ZC sequences having cyclic extension or truncation. Hence, the performance with an UL-RS designed using random-CAZAC sequences is expected to be similar to an UL-RS designed with extended ZC sequences in the presence of inter-Node B (or inter-cell) interference. In addition, an UL-RS designed using random-CAZAC sequences has the advantage of employing a much larger number of sequences while simultaneously providing a substantially lower CM.

Random-CAZAC sequence is 0.6019 dB, which is substantially lower than the CM of ZC extended sequences by 0.67 dB. Further, the largest CM for the 32 Random-CAZAC sequences is smaller than the QPSK CM of 1.05 dB by 0.35 dB.

If the worst case CM of the UL-RS generated with the random-CAZAC sequence is set to be equal to that of QPSK (1.05 dB), at least 32 UL-RS sequences can be obtained. This compares with only 10 UL-RS sequences using ZC extension. Note that even among these 10 codes, 4 codes have CM greater than that of QPSK.

Because 32 Random-CAZAC generated UL-RS sequences exist for 1 RB employing 12 sub-carriers, random sequence hopping for the UL-RS can be done for one RB allocations with much smaller probability of collisions with UL-RS transmitted by a UE in a different cell or the Node B. Since there are two UL-RS per sub-frame, the probability of a collision with sequence hopping is $$\left(\frac{1}{29} \times \frac{1}{29}\right) 0.0012.$$

This compares with probability of $$\left(\frac{1}{2} \times \frac{1}{2}\right) 0.0069$$

with ZC truncated sequences or $$\left(\frac{1}{10} \times \frac{1}{10}\right) 0.01$$

with ZC extended sequences. Therefore, Node B (or cell) planning may be avoided or substantially reduced with random-CAZAC sequences.

Random-CAZAC sequence generation provides full flexibility in trading off the number of generated sequences with the largest CM. For example, a number of random-CAZAC sequences larger than 32 may be obtained by allowing for somewhat larger CM and an even lower CM could be obtained by decreasing the number of random-CAZAC sequences below 32. The previous advantages of the 32 Random-CAZAC sequences extend to ACK/NACK signaling as it also occurs within one RB.

Table 3 summarizes the comparison of UL-RS signal design for one RB of length 12 using a random CAZAC sequence compared to using an extended Zadoff-Chu of length 12.

TABLE 3

Comparison of UL-RS design with length 12 using Random-CAZAC and extended/truncated ZC Sequences.

| Parameter | UL-RS designed using Random-CAZAC | UL-RS designed using extended ZC of length 11 |
|---|---|---|
| Number of Sequences | 32 | 10 or 12 |
| Worst case CM | 1.21 dB < QPSK (1.22 dB) | 1.50 dB > QPSK (1.22 dB) or 2.36 dB > QPSK (1.22 dB) |
| Sequence planning | Easier (avoided) | Harder |
| Mean and mean-square cross correlation | Similar | Similar |
| Sequence hopping for 1 RB (UL-RS, ACK/NACK) | Better | Worse |

Although the previous analysis focused on allocations of one RB, it can be extended in the same manner to larger RB allocations. Since the small RB allocations place a limit on the number of available sequences with good CM and cross-correlations and on associated cell planning or the effectiveness of sequence hopping, random-CAZAC sequence generation can apply to allocations of one RB and probably two RBs, while the usual ZC sequences can be used for larger RB allocations. Since for allocations of three RBs, 30 sequences with appropriate CM properties can be generated with ZC extension, 30 random-CAZAC sequences may be used for one and two RB allocations.

This implies that 30 sequences of length 12 and 30 sequences of length 24 need to be stored at the UE for use with one RB and two RB allocations. The sequence generation for larger RB allocations can be accomplished employing the usual circuitry used for ZC sequence generation. Alternately, using random-CAZAC sequences only for one RB allocations allows selection of 22 sequences out of the available 33 sequences (for lowest CM or cross-correlations), which is the same with 22 sequences available for two RB allocations with cyclic extension. Then, only 22 sequences of length 12 need to be stored.

The random-CAZAC sequences discussed above were given in the time domain. Table 4 reflects statistics for 30 corresponding frequency domain code sets for a one RB allocation (length 12) and a two RB allocation (length 24).

TABLE 4

Statistics of ZC extension/truncation and Random CAZAC Sequences.

| | Total Number of Sequences | Mean Cross-Correlation of all Cyclic Shifts | Square Root Mean Square Cross-Correlation of all Cyclic Shifts | Mean CM | Min CM | Max CM | Number of Sequences with CM less than or equal to QPSK (1.22) |
|---|---|---|---|---|---|---|---|
| ZC Cyclic Extension | 10 | 0.28 | 0.29 | 0.85 | 0.17 | 1.50 | 6 |
| ZC Truncation | 12 | 0.27 | 0.29 | 1.37 | 0.46 | 2.36 | 6 |
| Length 12 Random CAZAC Sequences 1-30 | 30 | 0.26 | 0.29 | 0.73 | 0.14 | 1.14 | 30 |
| Length 24 Random CAZAC Sequences 1-30 | 30 | 0.18 | 0.20 | 0.96 | 0.23 | 1.22 | 30 |

As can be seen from Table 4, the 30 Random CAZAC sequences of length 12 and 24 have similar or less CM as compared to QPSK (CM=1.22 using a CM slope of 1.56).

Figure 8A:
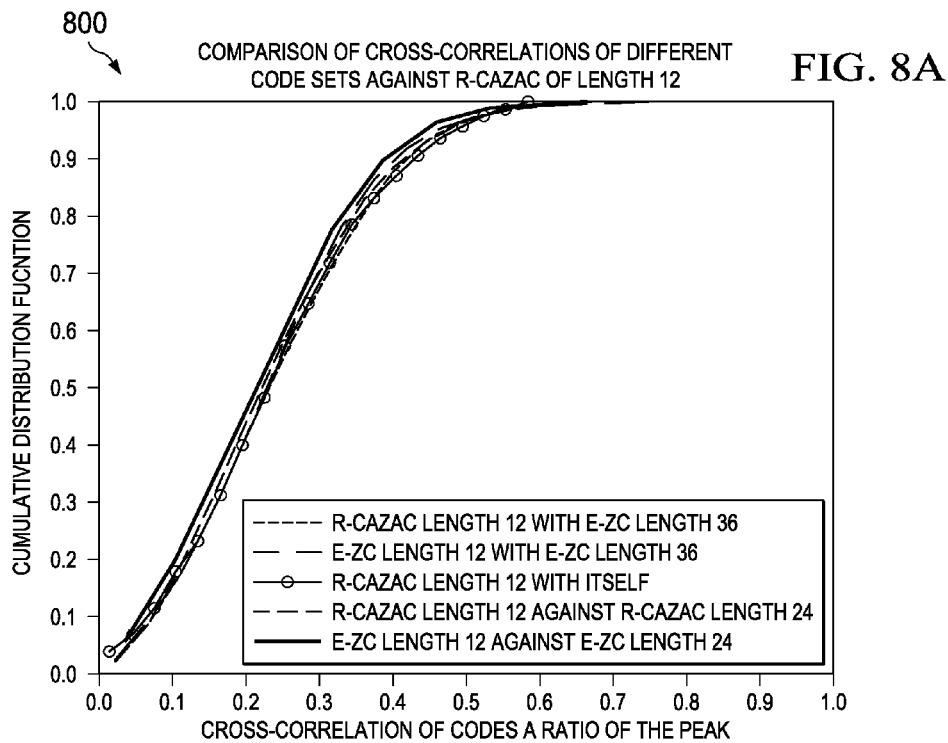
FIGS. 8A and 8B illustrate cumulative distribution functions of cross-correlations of the Random CAZAC sequences with themselves and with extended Zadoff-Chu (E-ZC) sequences of length three RBs.
Figure 8B:
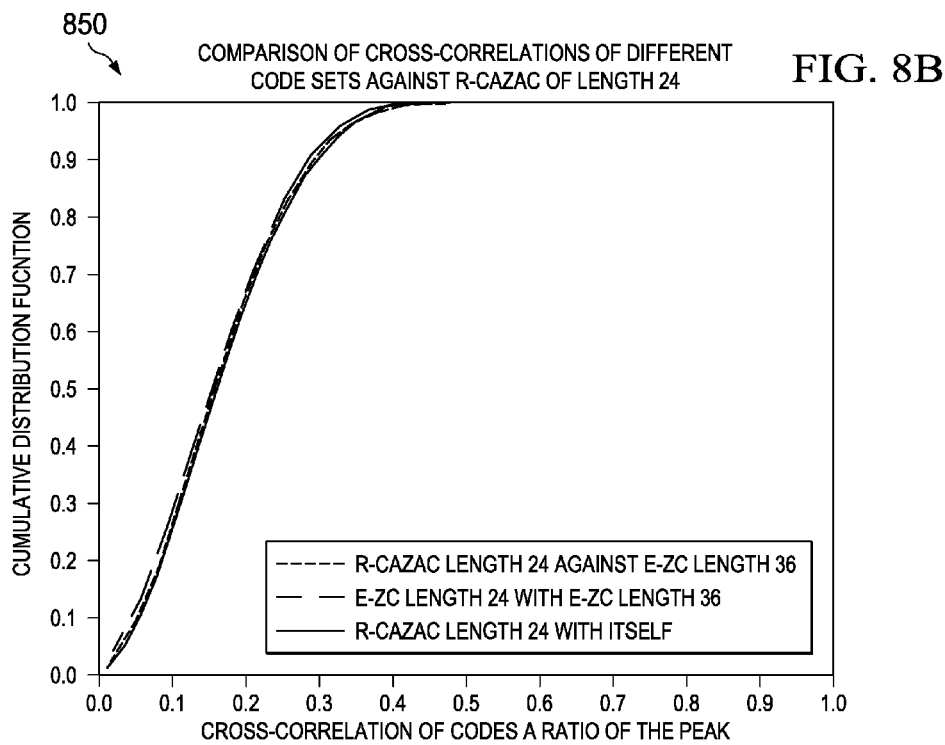

FIGS. 8A and 8B illustrate graphs 800 and 850 showing cumulative distribution functions of cross-correlations of the Random CAZAC sequences with themselves and with extended Zadoff-Chu (E-ZC) sequences of length three RBs. Graph 800 compares the cross correlation of the Random CAZAC sequences of length 12 against the cross correlation of these sequences with Random CAZAC sequences of length 24 and E-ZC sequences of length 36. Similarly, graph 850 compares the cross-correlation of length 24 Random CAZAC sequences among themselves and against length 36 E-ZC sequences. As seen in FIGS. 8A and 8B, the cumulative distribution functions (CDFs) of the Random CAZAC codes is similar to their CDF with E-ZC of length 36.

Statistics for the cross-correlation in FIGS. 8A and 8B is given below in Table 5.

TABLE 5

Statistics for different cross-correlations in FIGS. 8A and 8B (normalized)

| (Sequence 1, Sequence 2) | Mean of all Cyclic Shift Cross-Correlation | Mean Square of Cyclic Shift Cross-Correlation |
|---|---|---|
| (R-CAZAC length 12, E-ZC length 36) | 0.27 | 0.30 |
| (E-ZC length 12, E-ZC length 36) | 0.26 | 0.29 |
| (R-CAZAC length 12, R-CAZAC length 24) | 0.26 | 0.29 |
| (E-ZC length 12, E-ZC length 24) | 0.26 | 0.29 |
| (R-CAZAC length 24, E-ZC length 36) | 0.18 | 0.20 |
| (E-ZC length 24, E-ZC length 36) | 0.18 | 0.20 |

As can be seen from Table 5, the statistics of cross-correlation for random-CAZAC sequences of length 12 and 24 and that of E-ZC sequences of length 12 and 24 with sequences of larger RBs are similar to each other. Hence the performance of random-CAZAC sequences for small RBs is similar to extended ZC sequences. The bit error rate comparisons discussed with respect to FIGS. 6A, 6B and 7 are also valid for these random-CAZAC sequences, as well. Assuming six bits of precision to represent the phase of the random-CAZAC sequence, the memory storage for the random-CAZAC sequences is 297 bytes for length 12 and 594 bytes for length 24.

Referring again to FIG. 1B and in another embodiment of the user equipment transmitter, the reference signal unit 156 is configured to provide a QPSK sequence for the uplink reference signal corresponding to a one or two resource block allocation of the user equipment. The Zadoff-Chu sequence unit 157 is configured to generate a Zadoff-Chu sequence for the uplink reference signal corresponding to a resource block allocation of three or more for the user equipment. The transmit unit is configured to transmit the uplink reference signal to the Node B.

Table 6 reflects different statistical properties for 30 corresponding frequency domain code sets for a one RB allocation (length 12) wherein a QPSK structure is provided using computer generated (CG) code.

TABLE 6

Statistics of ZC extension/truncation and CG QPSK length 12 Sequences

| | Total Number of Sequences | Mean Cross-Correlation of all Cyclic Shifts | Square Root Mean Square Cross Correlation of all Cyclic Shifts | Mean CM | Min CM | Max CM | Number of Sequences with CM less than or equal to QPSK (1.22) |
|---|---|---|---|---|---|---|---|
| ZC Cyclic Extension | 10 | 0.28 | 0.29 | 0.85 | 0.17 | 1.50 | 6 |
| ZC Truncation | 12 | 0.27 | 0.29 | 1.37 | 0.46 | 2.36 | 6 |
| Length 12 CG Sequences 1-30 | 30 | 0.26 | 0.29 | 0.28 | 0.007 | 0.51 | 30 |

As evident from Table 6, the 30 CG QPSK sequences of length 12 lower CM as compared to QPSK (CM=1.22 using a CM slope of 1.56). Note that having a CM lower than QPSK is especially important for one RB allocations since the PUCCH transmission is entirely based on the transmission of such CAZAC sequences.

FIG. 9 illustrates a graph 900 showing cumulative distribution functions of all cyclic shift cross-correlations for a CG QPSK sequence of length 12 with itself, with of extended ZC sequences of length 36 and of extended ZC of length 12 with 36. As evident from the graph 900, the cross-correlation CDF of CG QPSK length 12 sequences is similar to the corresponding CDF with E-ZC of length 36. Statistics for the cross-correlations in FIG. 9 are given below in Table 7.

TABLE 7

Statistics for different cross-correlations in FIGS. 2 and 3 (normalized)

| (Sequence 1, Sequence 2) | Mean of all Cyclic Shift Cross-Correlations | Mean Square of Cyclic Shift Cross-correlations |
|---|---|---|
| (CG length 12, E-ZC length 36) | 0.26 | 0.30 |
| (E-ZC length 12, E-ZC length 36) | 0.26 | 0.29 |

As evident from Table 7, the statistics of cross-correlation for a CG QPSK sequence of length 12 against E-ZC of length 36 is similar to that of E-ZC of length 12 against E-ZC of length 36. Hence, the performance of CG length 12 is expected to be similar to that of the extended ZC sequences.

Figure 10:
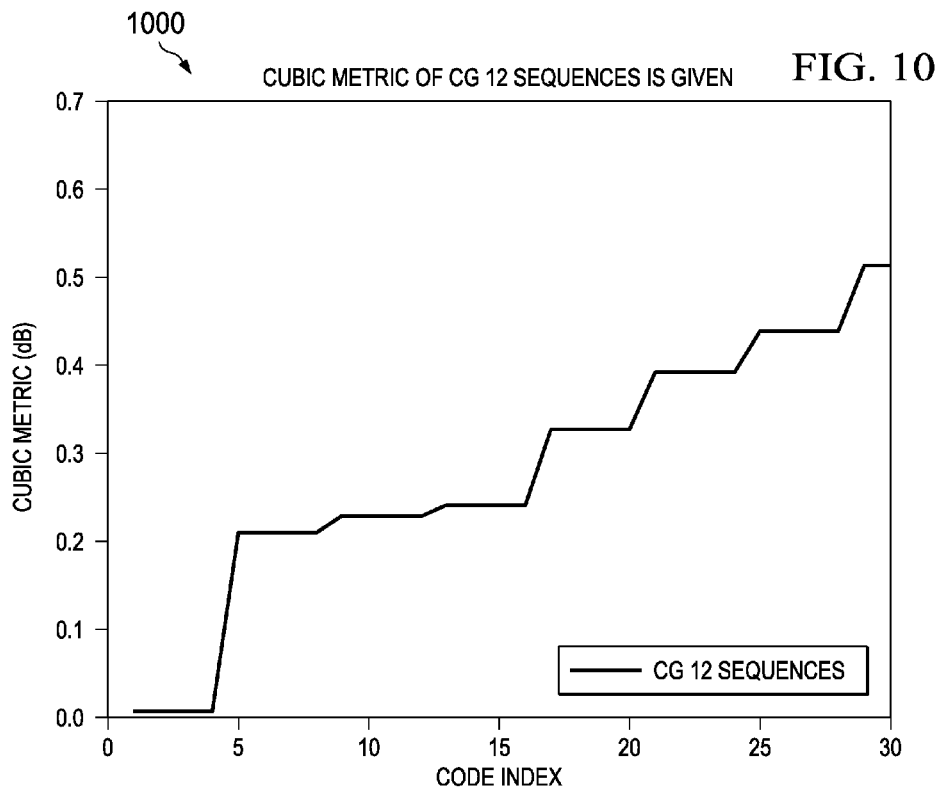
FIG. 10 illustrates the cubic metric of the QPSK sequence of length 12 sequences.

FIG. 10 illustrates a graph 1000 showing the cubic metric of the CG QPSK length 12 sequences. The CM is seen to increase step-wise with an increase in code index and maintains an adequate CM. Additionally, the memory storage for storing the sequences is only 720 bits, and hence only contributes to a small fractional percentage of overall UE memory storage.

The CG QPSK code stored in the UE memory are shown below:

TABLE 8

The QPSK sequences stored in UE memory are given in the form of real and imaginary parts of the sequence.

| Seq No. | 1 | 2 | 3 | 4 | 5 | 6 | 7 | 8 | 9 | 10 | 11 | 12 |
|---|---|---|---|---|---|---|---|---|---|---|---|---|
| *Real value of Computer Generated QPSK Sequences (Sample number)* | | | | | | | | | | | | |
| 1 | 0.707 | −0.707 | 0.707 | −0.707 | 0.707 | 0.707 | −0.707 | −0.707 | 0.707 | 0.707 | 0.707 | 0.707 |
| 2 | 0.707 | −0.707 | 0.707 | −0.707 | −0.707 | 0.707 | 0.707 | −0.707 | −0.707 | −0.707 | −0.707 | −0.707 |
| 3 | 0.707 | −0.707 | −0.707 | 0.707 | 0.707 | −0.707 | 0.707 | −0.707 | 0.707 | 0.707 | 0.707 | 0.707 |
| 4 | 0.707 | −0.707 | 0.707 | −0.707 | 0.707 | −0.707 | −0.707 | −0.707 | 0.707 | 0.707 | −0.707 | −0.707 |
| 5 | 0.707 | −0.707 | 0.707 | 0.707 | −0.707 | −0.707 | 0.707 | −0.707 | −0.707 | −0.707 | −0.707 | 0.707 |
| 6 | 0.707 | −0.707 | 0.707 | −0.707 | 0.707 | 0.707 | 0.707 | 0.707 | 0.707 | 0.707 | 0.707 | −0.707 |
| 7 | 0.707 | −0.707 | −0.707 | 0.707 | −0.707 | 0.707 | −0.707 | 0.707 | 0.707 | −0.707 | −0.707 | −0.707 |
| 8 | 0.707 | −0.707 | 0.707 | −0.707 | −0.707 | −0.707 | 0.707 | 0.707 | −0.707 | −0.707 | −0.707 | −0.707 |
| 9 | 0.707 | −0.707 | 0.707 | −0.707 | 0.707 | −0.707 | −0.707 | 0.707 | 0.707 | 0.707 | 0.707 | −0.707 |
| 10 | 0.707 | −0.707 | −0.707 | 0.707 | 0.707 | 0.707 | 0.707 | 0.707 | 0.707 | −0.707 | 0.707 | 0.707 |
| 11 | 0.707 | −0.707 | −0.707 | 0.707 | 0.707 | −0.707 | 0.707 | 0.707 | 0.707 | 0.707 | 0.707 | 0.707 |
| 12 | 0.707 | −0.707 | 0.707 | 0.707 | −0.707 | −0.707 | −0.707 | 0.707 | 0.707 | 0.707 | −0.707 | 0.707 |
| 13 | 0.707 | −0.707 | 0.707 | −0.707 | 0.707 | 0.707 | −0.707 | −0.707 | 0.707 | 0.707 | −0.707 | −0.707 |
| 14 | 0.707 | −0.707 | 0.707 | −0.707 | −0.707 | 0.707 | −0.707 | −0.707 | 0.707 | 0.707 | 0.707 | 0.707 |
| 15 | 0.707 | −0.707 | −0.707 | 0.707 | 0.707 | −0.707 | 0.707 | −0.707 | 0.707 | 0.707 | 0.707 | 0.707 |
| 16 | 0.707 | −0.707 | 0.707 | −0.707 | 0.707 | 0.707 | 0.707 | 0.707 | −0.707 | −0.707 | −0.707 | −0.707 |
| 17 | 0.707 | −0.707 | 0.707 | 0.707 | −0.707 | 0.707 | 0.707 | 0.707 | −0.707 | −0.707 | −0.707 | 0.707 |
| 18 | 0.707 | −0.707 | −0.707 | −0.707 | 0.707 | 0.707 | −0.707 | 0.707 | 0.707 | −0.707 | 0.707 | 0.707 |
| 19 | 0.707 | −0.707 | 0.707 | −0.707 | −0.707 | 0.707 | 0.707 | −0.707 | 0.707 | 0.707 | −0.707 | 0.707 |
| 20 | 0.707 | −0.707 | −0.707 | 0.707 | 0.707 | 0.707 | 0.707 | 0.707 | 0.707 | −0.707 | −0.707 | 0.707 |
| 21 | 0.707 | −0.707 | −0.707 | 0.707 | 0.707 | 0.707 | 0.707 | −0.707 | 0.707 | −0.707 | 0.707 | −0.707 |
| 22 | 0.707 | −0.707 | 0.707 | 0.707 | −0.707 | −0.707 | 0.707 | 0.707 | 0.707 | 0.707 | 0.707 | 0.707 |
| 23 | 0.707 | −0.707 | −0.707 | 0.707 | −0.707 | −0.707 | −0.707 | −0.707 | −0.707 | −0.707 | 0.707 | 0.707 |
| 24 | 0.707 | −0.707 | −0.707 | −0.707 | 0.707 | 0.707 | 0.707 | −0.707 | 0.707 | 0.707 | −0.707 | 0.707 |
| 25 | 0.707 | −0.707 | −0.707 | −0.707 | 0.707 | −0.707 | −0.707 | 0.707 | 0.707 | 0.707 | 0.707 | −0.707 |
| 26 | 0.707 | −0.707 | 0.707 | 0.707 | −0.707 | 0.707 | 0.707 | −0.707 | 0.707 | 0.707 | 0.707 | −0.707 |
| 27 | 0.707 | −0.707 | 0.707 | 0.707 | 0.707 | 0.707 | 0.707 | 0.707 | −0.707 | −0.707 | −0.707 | 0.707 |
| 28 | 0.707 | −0.707 | −0.707 | −0.707 | 0.707 | 0.707 | 0.707 | 0.707 | 0.707 | −0.707 | 0.707 | 0.707 |
| 29 | 0.707 | −0.707 | −0.707 | −0.707 | −0.707 | −0.707 | 0.707 | 0.707 | 0.707 | −0.707 | 0.707 | −0.707 |
| 30 | 0.707 | −0.707 | 0.707 | 0.707 | 0.707 | −0.707 | −0.707 | −0.707 | −0.707 | −0.707 | 0.707 | 0.707 |
| *Imaginary value of Computer Generated QPSK Sequences (Sample number)* | | | | | | | | | | | | |
| 1 | 0.707 | −0.707 | 0.707 | −0.707 | 0.707 | 0.707 | −0.707 | 0.707 | 0.707 | 0.707 | 0.707 | 0.707 |
| 2 | 0.707 | −0.707 | 0.707 | −0.707 | −0.707 | 0.707 | 0.707 | −0.707 | 0.707 | −0.707 | −0.707 | −0.707 |
| 3 | 0.707 | −0.707 | −0.707 | 0.707 | 0.707 | −0.707 | 0.707 | −0.707 | 0.707 | 0.707 | 0.707 | 0.707 |
| 4 | 0.707 | −0.707 | −0.707 | −0.707 | −0.707 | −0.707 | −0.707 | −0.707 | 0.707 | 0.707 | −0.707 | −0.707 |
| 5 | 0.707 | −0.707 | 0.707 | −0.707 | −0.707 | −0.707 | 0.707 | −0.707 | −0.707 | −0.707 | −0.707 | −0.707 |
| 6 | 0.707 | −0.707 | −0.707 | 0.707 | −0.707 | 0.707 | −0.707 | 0.707 | 0.707 | 0.707 | −0.707 | −0.707 |
| 7 | 0.707 | −0.707 | 0.707 | 0.707 | −0.707 | 0.707 | 0.707 | 0.707 | 0.707 | 0.707 | −0.707 | −0.707 |
| 8 | 0.707 | −0.707 | 0.707 | 0.707 | −0.707 | −0.707 | 0.707 | −0.707 | −0.707 | −0.707 | −0.707 | 0.707 |
| 9 | 0.707 | −0.707 | −0.707 | 0.707 | 0.707 | −0.707 | −0.707 | 0.707 | 0.707 | 0.707 | 0.707 | 0.707 |
| 10 | 0.707 | −0.707 | 0.707 | 0.707 | −0.707 | −0.707 | −0.707 | 0.707 | 0.707 | 0.707 | −0.707 | 0.707 |
| 11 | 0.707 | −0.707 | 0.707 | −0.707 | 0.707 | −0.707 | −0.707 | 0.707 | 0.707 | 0.707 | 0.707 | −0.707 |
| 12 | 0.707 | −0.707 | −0.707 | 0.707 | 0.707 | 0.707 | 0.707 | 0.707 | 0.707 | −0.707 | 0.707 | 0.707 |
| 13 | 0.707 | −0.707 | 0.707 | −0.707 | 0.707 | 0.707 | 0.707 | −0.707 | −0.707 | −0.707 | −0.707 | −0.707 |
| 14 | 0.707 | −0.707 | 0.707 | −0.707 | −0.707 | 0.707 | −0.707 | −0.707 | 0.707 | 0.707 | 0.707 | 0.707 |
| 15 | 0.707 | −0.707 | 0.707 | −0.707 | −0.707 | −0.707 | 0.707 | −0.707 | 0.707 | 0.707 | 0.707 | 0.707 |
| 16 | 0.707 | −0.707 | 0.707 | −0.707 | 0.707 | 0.707 | −0.707 | −0.707 | 0.707 | 0.707 | −0.707 | −0.707 |
| 17 | 0.707 | −0.707 | 0.707 | 0.707 | −0.707 | 0.707 | 0.707 | 0.707 | −0.707 | −0.707 | −0.707 | 0.707 |
| 18 | 0.707 | −0.707 | −0.707 | −0.707 | 0.707 | −0.707 | −0.707 | −0.707 | −0.707 | 0.707 | 0.707 | 0.707 |
| 19 | 0.707 | −0.707 | 0.707 | −0.707 | −0.707 | 0.707 | −0.707 | −0.707 | 0.707 | 0.707 | −0.707 | 0.707 |
| 20 | 0.707 | −0.707 | 0.707 | −0.707 | −0.707 | 0.707 | 0.707 | −0.707 | −0.707 | 0.707 | 0.707 | 0.707 |
| 21 | 0.707 | −0.707 | −0.707 | 0.707 | −0.707 | −0.707 | −0.707 | −0.707 | 0.707 | 0.707 | 0.707 | 0.707 |
| 22 | 0.707 | −0.707 | −0.707 | −0.707 | 0.707 | 0.707 | 0.707 | −0.707 | 0.707 | −0.707 | −0.707 | 0.707 |
| 23 | 0.707 | −0.707 | −0.707 | −0.707 | 0.707 | 0.707 | 0.707 | −0.707 | −0.707 | 0.707 | 0.707 | −0.707 |
| 24 | 0.707 | −0.707 | 0.707 | 0.707 | −0.707 | 0.707 | 0.707 | 0.707 | 0.707 | 0.707 | 0.707 | 0.707 |
| 25 | 0.707 | −0.707 | 0.707 | 0.707 | 0.707 | 0.707 | 0.707 | 0.707 | −0.707 | −0.707 | −0.707 | 0.707 |
| 26 | 0.707 | −0.707 | 0.707 | 0.707 | −0.707 | 0.707 | 0.707 | −0.707 | 0.707 | 0.707 | −0.707 | −0.707 |
| 27 | 0.707 | −0.707 | 0.707 | 0.707 | 0.707 | 0.707 | −0.707 | −0.707 | 0.707 | 0.707 | −0.707 | −0.707 |
| 28 | 0.707 | −0.707 | −0.707 | 0.707 | −0.707 | 0.707 | 0.707 | −0.707 | 0.707 | 0.707 | 0.707 | −0.707 |

TABLE 8-continued

The QPSK sequences stored in UE memory are given in
the form of real and imaginary parts of the sequence.

| Seq No. | 1 | 2 | 3 | 4 | 5 | 6 | 7 | 8 | 9 | 10 | 11 | 12 |
|---|---|---|---|---|---|---|---|---|---|---|---|---|
| 29 | 0.707 | 0.707 | −0.707 | −0.707 | 0.707 | −0.707 | 0.707 | −0.707 | −0.707 | 0.707 | −0.707 | −0.707 |
| 30 | 0.707 | −0.707 | 0.707 | −0.707 | −0.707 | 0.707 | −0.707 | −0.707 | 0.707 | −0.707 | −0.707 | −0.707 |

TABLE 9

The computer generated QPSK sequence codes from Table 8 are given in the phase quantization format $\frac{\pi}{4}(K=4)$ below.

| Computer Generated Sequence Number | Computer Generated QPSK Sequences (Sample number) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 1 | −3 | 1 | −3 | 1 | 1 | −3 | −3 | 1 | 1 | 1 | 1 |
| 2 | 1 | −3 | 1 | −3 | −3 | 1 | 1 | −3 | −3 | −3 | −3 | −3 |
| 3 | 1 | −3 | −3 | 1 | 1 | −3 | 1 | −3 | 1 | 1 | 1 | 1 |
| 4 | 1 | −3 | 1 | −3 | −3 | −3 | −3 | −3 | 1 | 1 | −3 | −3 |
| 5 | 1 | −3 | 1 | −1 | −3 | −3 | 1 | 3 | −3 | −3 | −3 | −1 |
| 6 | 1 | −3 | −1 | 1 | −3 | 1 | −1 | 1 | 1 | 1 | −1 | −3 |
| 7 | 1 | −3 | 3 | 1 | −3 | 1 | 3 | 1 | 1 | 1 | 3 | −3 |
| 8 | 1 | −3 | 1 | 3 | −3 | −3 | 1 | −1 | −3 | −3 | −3 | −3 |
| 9 | 1 | −3 | −1 | 3 | 1 | −3 | 3 | 1 | 1 | 1 | 1 | 3 |
| 10 | 1 | −3 | 3 | 1 | −1 | −1 | −1 | 1 | 1 | 3 | −1 | 1 |
| 11 | 1 | −3 | 3 | −1 | 1 | −3 | −1 | 1 | 1 | 1 | 1 | −1 |
| 12 | 1 | −3 | −1 | 1 | 3 | 3 | 3 | 1 | −1 | 3 | 1 |
| 13 | 1 | −3 | 1 | −3 | 1 | 1 | 3 | 3 | −1 | −1 | −3 | −3 |
| 14 | 1 | −3 | −1 | 3 | 3 | −1 | −3 | 1 | 1 | 1 | 1 | 1 |
| 15 | 1 | −3 | 3 | −1 | −1 | 3 | −3 | 1 | 1 | 1 | 1 | 1 |
| 16 | 1 | −3 | 1 | −3 | 1 | 1 | −1 | −1 | 3 | 3 | −3 | −3 |
| 17 | 1 | −3 | 1 | 1 | −3 | 1 | 1 | 1 | −3 | −3 | −3 | 1 |
| 18 | 1 | −3 | −3 | −3 | 1 | 1 | 1 | −3 | 1 | 1 | −3 | 1 |
| 19 | 1 | −3 | −1 | 3 | 3 | 1 | 1 | 3 | 3 | −1 | −3 | 1 |
| 20 | 1 | −3 | 3 | −1 | −1 | 1 | 1 | −1 | −1 | 3 | −3 | 1 |
| 21 | 1 | −3 | −3 | 1 | −1 | −1 | −1 | −3 | −1 | −3 | 1 | 3 |
| 22 | 1 | −3 | −1 | −1 | 3 | 3 | 1 | −1 | −1 | 1 | −1 | 1 |
| 23 | 1 | −3 | −3 | 1 | 3 | 3 | 3 | −3 | 3 | −3 | 1 | −1 |
| 24 | 1 | −3 | 3 | 3 | −1 | −1 | 1 | 3 | 3 | 1 | 3 | 1 |
| 25 | 1 | −3 | 3 | 3 | 1 | 3 | 3 | 1 | −3 | −1 | −1 | 3 |
| 26 | 1 | −3 | −3 | −1 | 3 | 1 | 1 | 3 | 1 | 1 | −1 | 3 |
| 27 | 1 | −3 | −1 | −1 | 1 | −1 | −1 | 1 | −3 | 3 | 3 | −1 |
| 28 | 1 | −3 | −3 | 3 | −1 | 1 | 1 | −1 | 1 | 1 | 3 | −1 |
| 29 | 1 | 3 | −3 | −3 | 3 | −3 | 1 | −1 | −1 | 3 | −1 | −3 |
| 30 | 1 | −3 | 1 | −1 | −1 | 3 | −3 | −3 | 3 | −3 | −1 | −1 |

Figure 11:
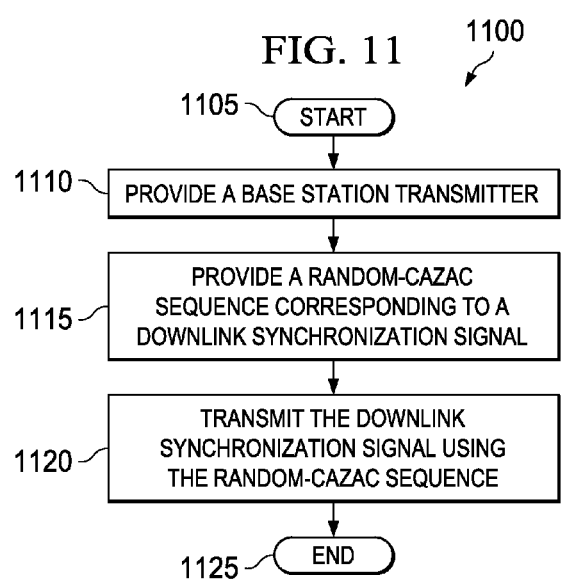
FIG. 11 illustrates a flow diagram of an embodiment of a method of operating a base station transmitter carried out according to the principles of the present disclosure.

FIG. 11 illustrates a flow diagram of an embodiment of a method of operating a base station transmitter 1100 carried out according to the principles of the present disclosure. The method 1100 is for use with a cellular communication system and starts in a step 1105. Then, in a step 1110, a base station transmitter is provided, and a randomly-generated constant amplitude zero autocorrelation (random-CAZAC) sequence corresponding to a downlink synchronization signal is provided in a step 1115.

The random CAZAC sequence may be used for a primary synchronization sequence. Additionally, two complex random CAZAC sequences and one of their complex conjugates may be employed to provide three primary synchronization sequences. The random CAZAC sequence may be provided in the time domain.

A group of the random CAZAC sequences provides a mean cross-correlation that is no greater than a corresponding group of cyclic extended or truncated Zadoff-Chu sequences. Additionally, a group of the random CAZAC sequences provides a square root mean square cross-correlation that is no greater than a corresponding group of cyclic extended or truncated Zadoff-Chu sequences. Correspondingly, a group of the random CAZAC sequences provides a cubic metric that is no greater than a corresponding group of cyclic extended or truncated Zadoff-Chu sequences. The downlink synchronization signal is transmitted using the random-CAZAC sequence in a step 1120, and the method 1100 ends in a step 1125.

Figure 12:
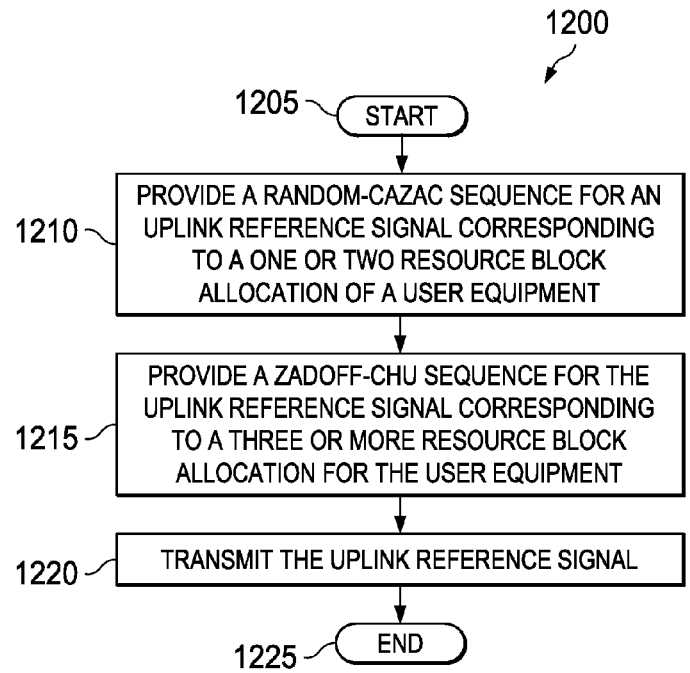
FIG. 12 illustrates a flow diagram of an embodiment of a method of operating a user equipment transmitter carried out according to the principles of the present disclosure.

FIG. 12 illustrates a flow diagram of an embodiment of a method of operating a user equipment transmitter 1200 carried out according to the principles of the present disclosure. The method 1200 is for use with a cellular communication system and starts in a step 1205. Then, in a step 1210, a randomly-generated constant amplitude zero autocorrelation (random-CAZAC) sequence is provided for an uplink reference signal corresponding to a one resource block allocation of the user equipment.

In one embodiment, the random-CAZAC sequence is extended to correspond to a two resource block allocation of the user equipment. The random-CAZAC sequence is selected from a group of random-CAZAC sequences that is stored in the user equipment. Additionally, the random-CAZAC sequence is provided in the frequency domain.

A group of the random CAZAC sequences provides a mean cross-correlation that is no greater than a corresponding group of cyclic extended or truncated Zadoff-Chu sequences. Additionally, the group of random CAZAC sequences provides a square root mean square cross-correlation that is no greater than a corresponding group of cyclic extended or truncated Zadoff-Chu sequences. Correspondingly, the group of random CAZAC sequences provides a cubic metric that is no greater than a corresponding group of cyclic extended or truncated Zadoff-Chu sequences.

A Zadoff-Chu sequence for the uplink reference signal corresponding to a three or more resource block allocation for the user equipment is provided in a step 1215. The uplink reference signal is transmitted in a step 1220, and the method 1200 ends in a step 1225.

Figure 13:
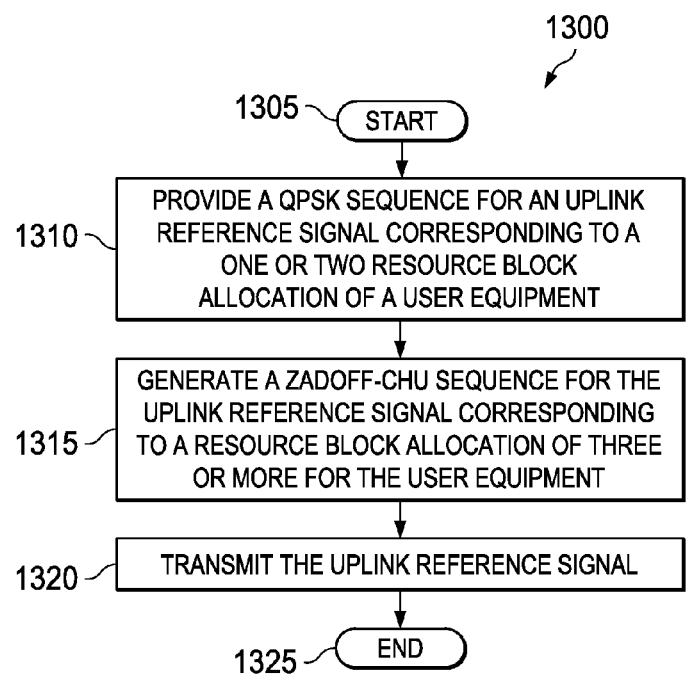
FIG. 13 illustrates a flow diagram of another embodiment of a method of operating a user equipment transmitter carried out according to the principles of the present disclosure.

FIG. 13 illustrates a flow diagram of another embodiment of a method of operating a user equipment transmitter 1300 carried out according to the principles of the present disclosure. The method 1300 is for use with a cellular communication system and starts in a step 1305. Then, in a step 1310, a QPSK sequence is provided for an uplink reference signal corresponding to a one or two resource block allocation of the user equipment. The QPSK sequence is selected from a group of QPSK sequences that is stored in the user equipment.

A group of the QPSK sequences provides a mean cross-correlation that is no greater than a corresponding group of cyclic extended or truncated Zadoff-Chu sequences. Additionally, the group of the QPSK sequences provides a square root mean square cross-correlation that is no greater than a corresponding group of cyclic extended or truncated Zadoff-Chu sequences. Correspondingly, the group of the QPSK sequences provides a cubic metric that is no greater than a corresponding group of cyclic extended or truncated Zadoff-Chu sequences.

In one embodiment, the QPSK sequence is selected from the QPSK sequences consisting of $e^{j\phi(n)\pi/4}$, where the value of $\phi(n)$; n=0, 1, . . . , 11 is given by one of the sequences below:

S1={1, −3, 3, 1, −1, −1, −1, 1, 1, 3, −1, 1};
S2={1, −3, −1, 3, 3, −1, −3, 1, 1, 1, 1, 1};
S3={1, −3, 1, 1, −3, 1, 1, 1, −3, −3, −3, 1};
S4={1, −3, 3, −1, −1, 1, 1, −1, −1, 3, −3 1};
S5={1, −3, 3, 3, 1, 3, 3, 1, −3, −1, −1, 3}; and
S6={1, 3, −3, −3, 3, −3, 1, −1, −1, 3, −1, −3}.

A Zadoff-Chu sequence for the uplink reference signal corresponding to a resource block allocation of three or more for the user equipment is generated in a step 1315. The uplink reference signal is transmitted in a step 1320, and the method 1300 ends in a step 1325.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A user equipment transmitter for use with a cellular communication system, comprising:
   a reference signal unit configured to provide a randomly-generated constant amplitude zero autocorrelation (random-CAZAC) sequence for an uplink reference signal corresponding to a one resource block allocation of the user equipment;
   a transmit unit configured to transmit the uplink reference signal using the random-CAZAC sequence; and
   wherein a group of random CAZAC sequences provides a mean cross-correlation that is no greater than a corresponding group of cyclic extended or truncated Zadoff-Chu sequences.

2. A user equipment transmitter for use with a cellular communication system, comprising:
   a reference signal unit configured to provide a randomly-generated constant amplitude zero autocorrelation (random-CAZAC) sequence for an uplink reference signal corresponding to a one resource block allocation of the user equipment;
   a transmit unit configured to transmit the uplink reference signal using the random-CAZAC sequence; and
   wherein a group of random CAZAC sequences provides a square root mean square cross-correlation that is no greater than a corresponding group of cyclic extended or truncated Zadoff-Chu sequences.

3. A user equipment transmitter for use with a cellular communication system, comprising:
   a reference signal unit configured to provide a randomly-generated constant amplitude zero autocorrelation (random-CAZAC) sequence for an uplink reference signal corresponding to a one resource block allocation of the user equipment;
   a transmit unit configured to transmit the uplink reference signal using the random-CAZAC sequence; and
   wherein a group of random CAZAC sequences provides a cubic metric that is no greater than a corresponding group of cyclic extended or truncated Zadoff-Chu sequences.

4. A method of operating a user equipment transmitter for use with a cellular communication system, comprising:
   providing a randomly-generated constant amplitude zero autocorrelation (random-CAZAC) sequence for an uplink reference signal corresponding to a one resource block allocation of the user equipment;
   transmitting the uplink reference signal using the random-CAZAC sequence; and
   wherein a group of random CAZAC sequences provides a mean cross-correlation that is no greater than a corresponding group of cyclic extended or truncated Zadoff-Chu sequences.

5. A method of operating a user equipment transmitter for use with a cellular communication system, comprising:
   providing a randomly-generated constant amplitude zero autocorrelation (random-CAZAC) sequence for an uplink reference signal corresponding to a one resource block allocation of the user equipment;
   transmitting the uplink reference signal using the random-CAZAC sequence; and
   wherein a group of random CAZAC sequences provides a square root mean square cross-correlation that is no greater than a corresponding group of cyclic extended or truncated Zadoff-Chu sequences.

6. A method of operating a user equipment transmitter for use with a cellular communication system, comprising:
   providing a randomly-generated constant amplitude zero autocorrelation (random-CAZAC) sequence for an uplink reference signal corresponding to a one resource block allocation of the user equipment;
   transmitting the uplink reference signal using the random-CAZAC sequence; and
   wherein a group of random CAZAC sequences provides a cubic metric that is no greater than a corresponding group of cyclic extended or truncated Zadoff-Chu sequences.

* * * * *